US007493328B2

(12) United States Patent  
Enderwick et al.

(10) Patent No.: US 7,493,328 B2  
(45) Date of Patent: Feb. 17, 2009

(54) STORING AND SEARCHING A HIERARCHY OF POLICIES AND ASSOCIATIONS THEREOF OF PARTICULAR USE WITH IP SECURITY POLICIES AND SECURITY ASSOCIATIONS

(75) Inventors: Thomas Jeffrey Enderwick, San Jose, CA (US); Henry Kin-Chuen Kwok, Fremont, CA (US); Ashwath Nagaraj, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 78 days.

(21) Appl. No.: 11/273,289

(22) Filed: Nov. 13, 2005

(65) Prior Publication Data

US 2006/0074899 A1    Apr. 6, 2006

Related U.S. Application Data

(63) Continuation of application No. 10/616,737, filed on Jul. 9, 2003, now Pat. No. 6,988,106.

(51) Int. Cl.
*G06F 7/00* (2006.01)

(52) U.S. Cl. ..................... 707/100; 711/101
(58) Field of Classification Search ............ 707/1, 707/100, 3, 4; 726/1, 13, 3; 370/392; 709/223; 711/101, 108
See application file for complete search history.

(56) References Cited

U.S. PATENT DOCUMENTS

| 3,648,264 | A | 3/1972 | Beausoleil |
| 4,296,475 | A | 10/1981 | Nederlof et al. |
| 4,791,606 | A | 12/1988 | Threewitt et al. |
| 4,996,666 | A | 2/1991 | Duluk, Jr. |
| 5,339,076 | A | 8/1994 | Jiang |
| 5,383,146 | A | 1/1995 | Threewitt |
| 5,404,482 | A | 4/1995 | Stamm et al. |
| 5,428,565 | A | 6/1995 | Shaw |
| 5,440,715 | A | 8/1995 | Wyland |
| 5,450,351 | A | 9/1995 | Heddes |
| 5,684,954 | A | 11/1997 | Kaiserswerth et al. |

(Continued)

OTHER PUBLICATIONS

S. Kent and R. Atkinson, "Security Architecture for the Internet Protocol," RFC 2401, Nov. 1998, 66 pages, Internet Engineering Task Force, www.ietf.org.

(Continued)

*Primary Examiner*—Greta L Robinson
(74) *Attorney, Agent, or Firm*—The Law Office of Kirk D. Williams

(57) ABSTRACT

Mechanisms for storing and searching a hierarchy of policies and associations thereof are disclosed which may be particularly useful for implementing security protocols, such as, but not limited to Internet Protocol security (IPsec). For example, a hierarchy of policies is stored in a search priority order in an associative memory, with each association of a particular policy stored higher in the search priority than its associated policy and after any other policy. Therefore, a lookup operation on the associative memory will identify a matching association, if one, else its matching policy. A match of a policy instead of an association may result in a corresponding association being added in the appropriate location. For IPsec implementations, the lookup word is typically derived from the packet, with this packet being typically processed based on the identified policy or association.

17 Claims, 17 Drawing Sheets

U.S. PATENT DOCUMENTS

| | | | |
|---|---|---|---|
| 5,802,567 | A | 9/1998 | Liu et al. |
| 5,841,874 | A | 11/1998 | Kempke et al. |
| 5,852,569 | A | 12/1998 | Srinivasan et al. |
| 5,956,336 | A | 9/1999 | Loschke et al. |
| 5,978,885 | A | 11/1999 | Clark, II |
| 6,038,560 | A | 3/2000 | Wical |
| 6,041,389 | A | 3/2000 | Rao |
| 6,047,369 | A | 4/2000 | Colwell et al. |
| 6,069,573 | A | 5/2000 | Clark, II et al. |
| 6,081,440 | A | 6/2000 | Washburn et al. |
| 6,134,135 | A | 10/2000 | Andersson |
| 6,137,707 | A | 10/2000 | Srinivasan et al. |
| 6,154,384 | A | 11/2000 | Nataraj et al. |
| 6,175,513 | B1 | 1/2001 | Khanna |
| 6,181,698 | B1 | 1/2001 | Hariguchi |
| 6,199,140 | B1 | 3/2001 | Srinivasan et al. |
| 6,240,003 | B1 | 5/2001 | McElroy |
| 6,246,601 | B1 | 6/2001 | Pereira |
| 6,307,855 | B1 | 10/2001 | Hariguchi |
| 6,374,326 | B1 | 4/2002 | Kansal et al. |
| 6,389,506 | B1 | 5/2002 | Ross et al. |
| 6,470,332 | B1 | 10/2002 | Weschler |
| 6,526,474 | B1 | 2/2003 | Ross |
| 6,535,951 | B1 | 3/2003 | Ross |
| 6,546,391 | B1 * | 4/2003 | Tsuruoka ........................ 707/8 |
| 6,567,812 | B1 | 5/2003 | Garrecht et al. |
| 6,606,681 | B1 | 8/2003 | Uzun |
| 6,651,096 | B1 | 11/2003 | Gai et al. |
| 6,658,002 | B1 | 12/2003 | Ross et al. |
| 6,658,458 | B1 | 12/2003 | Gai et al. |
| 6,687,144 | B2 | 2/2004 | Batson et al. |
| 6,715,029 | B1 | 3/2004 | Trainin et al. |
| 6,717,946 | B1 | 4/2004 | Hariguchi et al. |
| 6,725,326 | B1 | 4/2004 | Patra et al. |
| 6,738,862 | B1 | 5/2004 | Ross et al. |
| 6,775,737 | B1 | 8/2004 | Warkhede et al. |
| 6,862,281 | B1 | 3/2005 | Chandrasekaran |
| 6,871,262 | B1 | 3/2005 | Oren et al. |
| 6,871,265 | B1 | 3/2005 | Oren et al. |
| 7,107,464 | B2 * | 9/2006 | Shapira et al. ................. 726/15 |
| 7,158,519 | B2 * | 1/2007 | Kanakubo ................... 370/392 |
| 2001/0042204 | A1 * | 11/2001 | Blaker et al. ................. 713/165 |
| 2003/0028804 | A1 * | 2/2003 | Noehring et al. ............. 713/201 |
| 2003/0229636 | A1 * | 12/2003 | Mattausch et al. ............. 707/6 |
| 2003/0231631 | A1 * | 12/2003 | Pullela ....................... 370/392 |
| 2004/0024757 | A1 * | 2/2004 | Park et al. ...................... 707/3 |
| 2004/0030802 | A1 | 2/2004 | Eatherton et al. |
| 2004/0030803 | A1 * | 2/2004 | Eatherton et al. ........... 709/245 |

OTHER PUBLICATIONS

Jon P. Wade and Charles G. Sodini, "A Ternary Content Addressable Search Engine," IEEE Journal of Solid-State Circuits, vol. 24, No. 4, Aug. 1989, pp. 1003-1013.

Teuvo Kohonen, Content-Addressable Memories, 1987, pp. 128-129 and 142-144, Springer-Verlang, New York.

Brian Dipert, ed., "Special-purpose SRAMs Smooth the Ride," EDN, Jun. 24, 1999, pp. 93-104.

"What is a CAM (Content-Addressable Memory)?." Application Brief AB-N6, Rev. 2a, Music Semiconductors, Milpitas, CA, Sep. 30, 1998, 4 pages.

"Reading Out the Valid LANCAM Memory Entries." Application Brief AB-N4, Rev. 1a, Music Semiconductors, Milpitas. CA, Sep. 30, 1998, 4 pages.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN-N25, Rev. 0a, Music Semiconductors, Milpitas, CA, Oct. 1, 1998, 16 pages.

"Using Music Devices and RCPs for IP Flow Recognition," Application Note AN-N27, Rev. 0, Music Semiconductors, Milpitas, CA, Oct. 21, 1998, 20 pages.

"Wide Ternary Searches Using Music CAMs and RCPs," Application Note AN-N31, Rev. 0, Music Semiconductors, Milpitas, CA, Apr. 13, 1999, 8 pages.

Anthony McAuley and Paul Francis, "Fast Routing Table Lookup Using CAMs," Networking: Foundation for the Future, Proceedings of the Annual Joint Conference of the Computer and Communications Societies, Los Alamitos, Mar. 28, 1993, pp. 1382-1391, vol. 2, Conf 12.

Tong-Bi Pei and Charles Zukowski, "VLSI Implementation of Routing Tables: Tries and CAMS," Networking in the Nineties, Proceedings of the Annual Joint Conference of the Computer and Communications Societies, New York, Apr. 7, 1991, pp. 515-524, vol. 2, Conf. 10.

Zao et al, Domain Based Internet Security Policy Management, DARPA Information Survivability Conference and Exposition, 2000. DISCEX '00. Proceedings vol. 1, 25-27, Jan. 2000, pp. 41-53.

* cited by examiner

IPSEC MECHANISM

```
Arguments: highIncl, lowIncl; // range is [highIncl, lowIncl]

// Keep four stacks: two for results (value and masks), two for work in progress: bit and prefix
// for 16 bit fields, the results can be up to 30 TCAM entries, and the wip stacks must be 17 entries
// deep. (seems to be 2(N-1) worst case entries, but I have not generated a proof!)

push (prefixStack, 0), push (bitStack, precision); // 16 for port numbers
do {
    prefix = pop (prefixStack), bit = pop (bitStack);
    mask = (1 << bit) - 1;
    highTry = prefix | mask, lowTry = prefix & ~mask;
    if (highTry <= highIncl && lowTry >= lowIncl) { // entry covers a subset of range - save it
        push (valueStack, prefix), push (maskStack, mask);
    } else if (lowTry > highIncl || highTry < lowIncl) { // entry covers a disjoint set - forget it
        // do nothing
    } else { // entry covers some value inside and outside range - split it
        push (prefixStack, prefix), push (bitStack, bit - 1);
        push (prefixStack, prefix | 1 << (bit - 1)), push (bitStack, bit - 1);
    }
} while (StackNotEmpty (prefixStack));
```

SPLITTING ENTRIES INTO MULTIPLE ENTRIES

FIGURE 5B

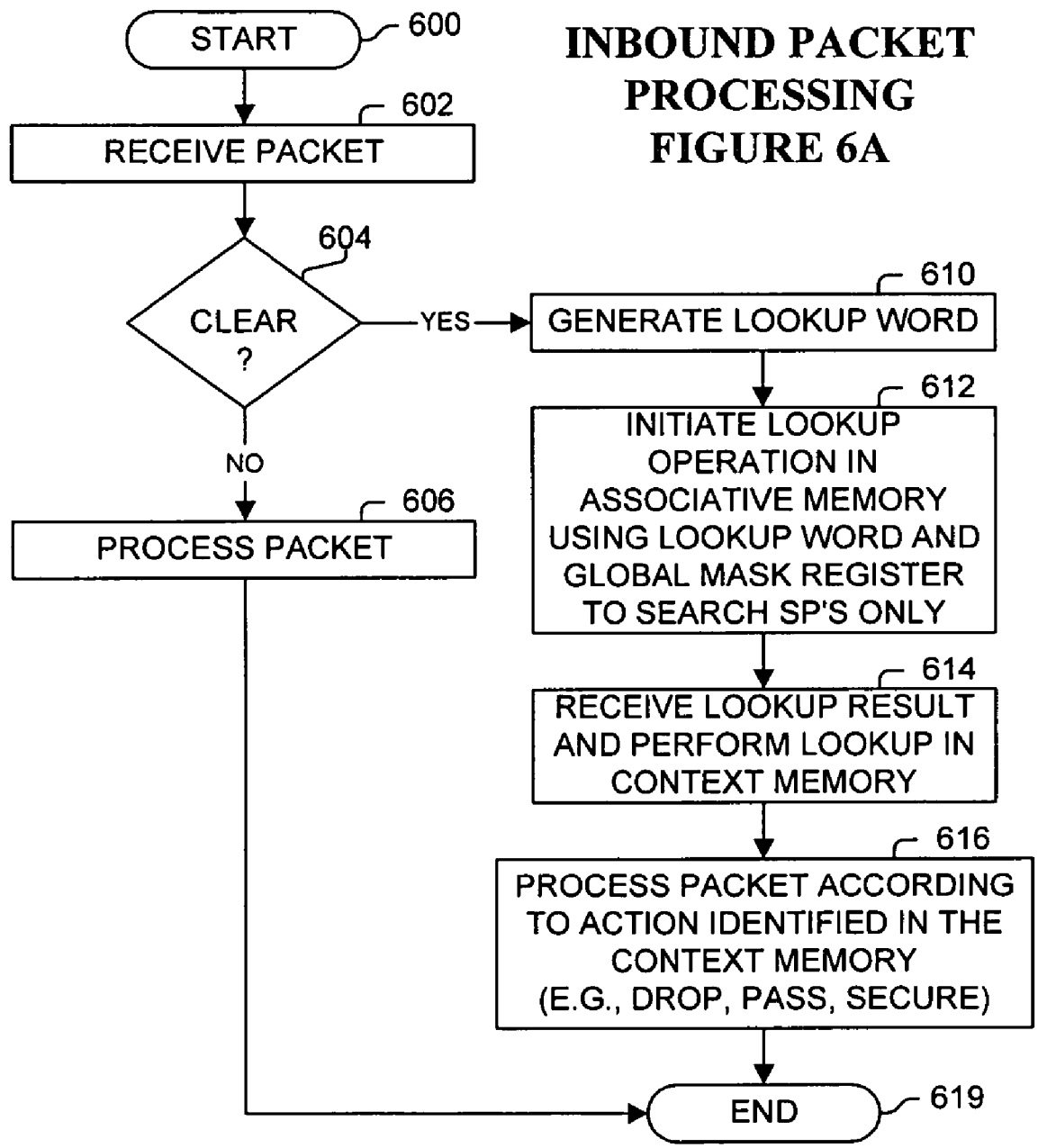

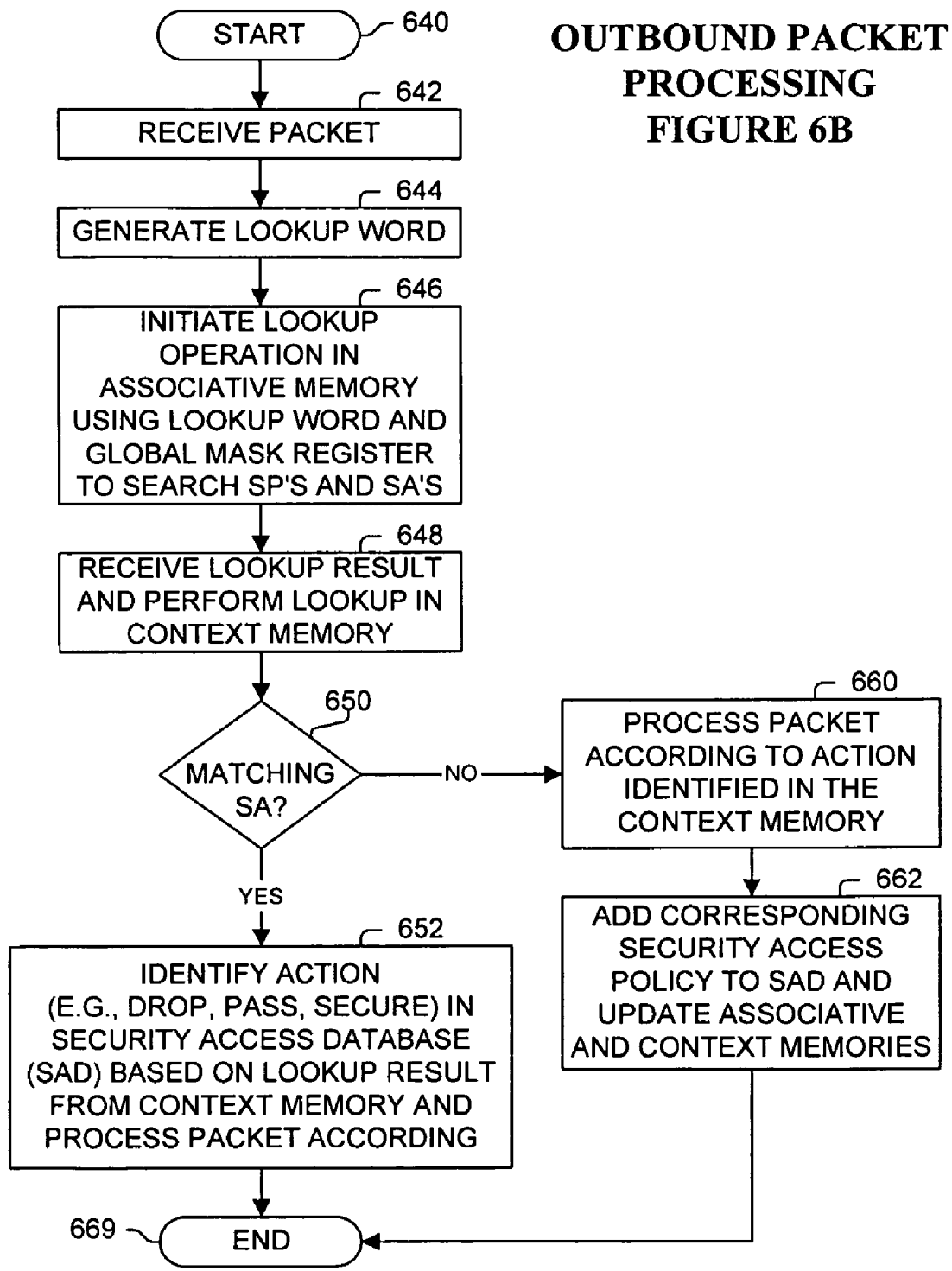

ADDING ENTRY

EXPAND PARTITION

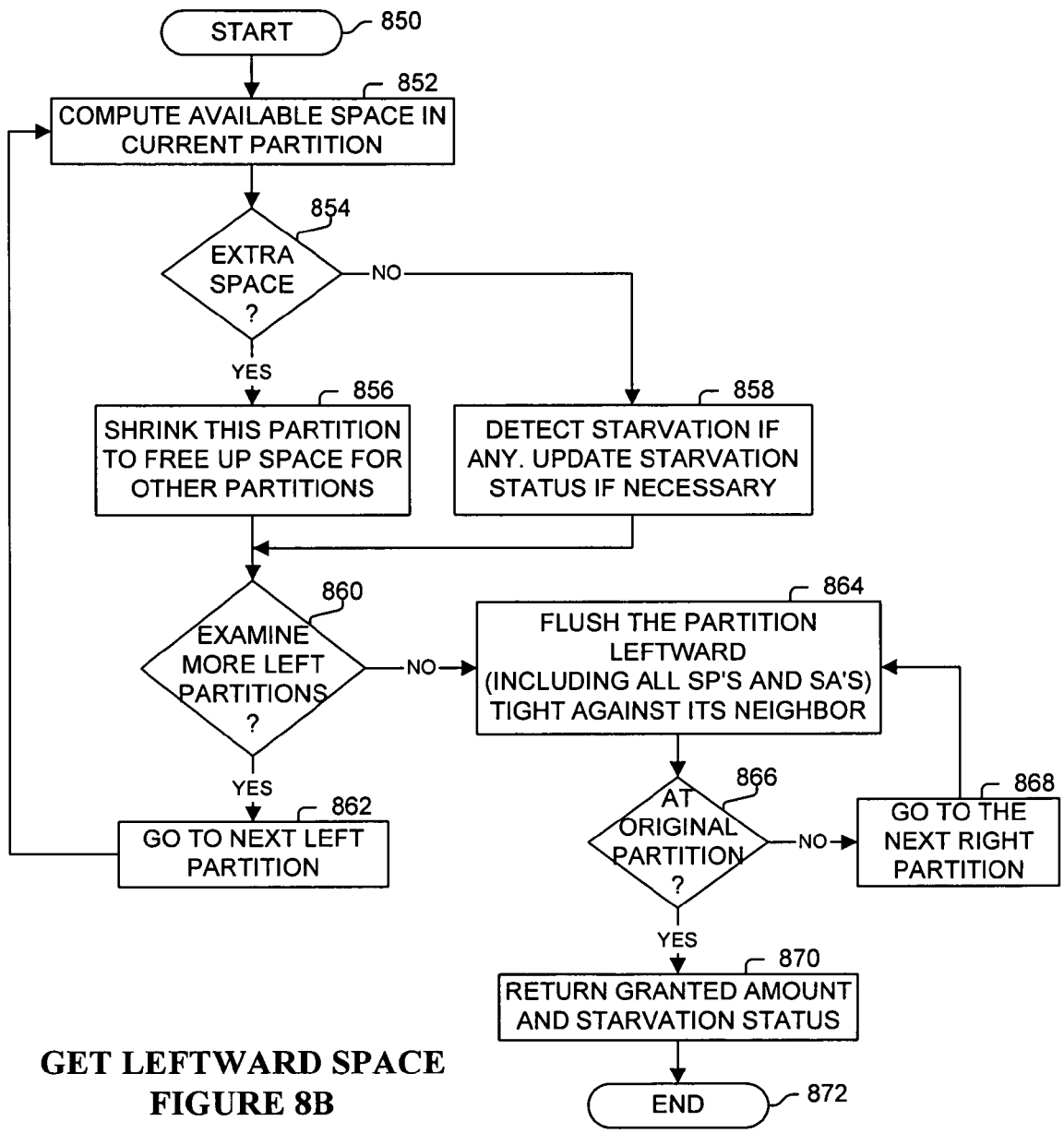
GET LEFTWARD SPACE FIGURE 8B

GET RIGHTWARD SPACE

**FEED STARVING
LEFT PARTITION

**FEED STARVING
LEFT PARTITION

STORING AND SEARCHING A HIERARCHY OF POLICIES AND ASSOCIATIONS THEREOF OF PARTICULAR USE WITH IP SECURITY POLICIES AND SECURITY ASSOCIATIONS

CROSS-REFERENCE TO RELATED APPLICATIONS

This is a continuation of Ser. No. 10/616,737, now U.S. Pat. No. 6,988,106 filed Jul. 9, 2003, which is hereby incorporated by reference in its entirety.

TECHNICAL FIELD

One embodiment of the invention especially relates to communications and computer systems; and more particularly, one embodiment relates to storing and searching a hierarchy of policies and associations thereof, which may be particularly useful for implementing security policies and security associations, such as, but not limited to Internet Protocol security (IPsec) in routers, packet switching systems, computers, and/or other devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A security architecture for the Internet Protocol (IPsec) is defined in. S. KENT and R. ATKINSON, "Security Architecture for IP," RFC 2401, November 1998, which is hereby incorporated by reference.

An IPsec implementation operates in a host or a security gateway environment, affording protection to IP traffic. The protection offered is based on requirements defined by a Security Policy Database (SPD) established and maintained by a user or system administrator, or by an application operating within constraints established by either of the above. In general, packets are selected for one of three processing modes based on IP and transport layer header information matched against entries in the database. Each packet is either afforded IPsec security services, discarded, or allowed to bypass IPsec, based on the applicable database policies.

IPsec provides security services at the IP layer by enabling a system to select required security protocols, determine the algorithm(s) to use for the service(s), and put in place any cryptographic keys required to provide the requested services. IPsec can be used to protect one or more "paths" between a pair of hosts, between a pair of security gateways, or between a security gateway and a host. The set of security services that IPsec can provide includes access control, connectionless integrity, data origin authentication, rejection of replayed packets (a form of partial sequence integrity), confidentiality (encryption), and limited traffic flow confidentiality. Because these services are provided at the IP layer, they can be used by any higher layer protocol, e.g., TCP, UDP, ICMP, BGP, etc.

IPsec packet classification is specified as a two-layer hierarchy: the relevant security policy (SP) must be found first out of an ordered list of SPs, and then within the context of the located SP, the correct security association (SA) must be found. A security association is a simplex "connection" that affords security services to the traffic carried by it. To secure typical, bi-directional communication between two hosts or between two security gateways, two security associations (one in each direction) are required. A security association is uniquely identified by a triple consisting of a Security Parameter Index (SPI), an IP Destination Address, and a security protocol identifier. In principle, the destination address may be a unicast address, an IP broadcast address, or a multicast group address. The set of security services offered by an SA depends on the security protocol selected, the SA mode, the endpoints of the SA, and on the election of optional services within the protocol. For example, one security protocol provides data origin authentication and connectionless integrity for IP datagrams.

The IP datagrams transmitted over an individual SA are afforded protection by exactly one security protocol. Sometimes a security policy may call for a combination of services for a particular traffic flow that is not achievable with a single SA. In such instances it will be necessary to employ multiple SAs to implement the required security policy. The term "security association bundle" or "SA bundle" is applied to a sequence of SAs through which traffic must be processed to satisfy a security policy. The order of the sequence is defined by the policy. (Note that the SAs that comprise a bundle may terminate at different endpoints. For example, one SA may extend between a mobile host and a security gateway and a second, nested SA may extend to a host behind the gateway.)

RFC 2401 defines that there are two nominal databases in the IPsec general model, with these two databases being the security policy database (SPD) and the security association database (SAD). The former specifies the policies that determine the disposition of all IP traffic inbound or outbound from a host, security gateway, or BITS or BITW IPsec implementation. The latter database contains parameters that are associated with each (active) security association. This section also defines the concept of a selector, a set of IP and upper layer protocol field values that is used by the security policy database to map traffic to a policy, i.e., an SA (or SA bundle).

Each interface for which IPsec is enabled requires nominally separate inbound vs. outbound databases (SAD and SPD), because of the directionality of many of the fields that are used as selectors. Typically there is just one such interface, for a host or security gateway (SG). Note that an SG would always have at least two interfaces, but the "internal" one to the corporate net, usually would not have IPsec enabled and so only one pair of SADs and one pair of SPDs would be needed. On the other hand, if a host had multiple interfaces or an SG had multiple external interfaces, it might be necessary to have separate SAD and SPD pairs for each interface.

Ultimately, a security association is a management construct used to enforce a security policy in the IPsec environment. Thus, an essential element of SA processing is an underlying Security Policy Database (SPD) that specifies what services are to be offered to IP datagrams and in what fashion. The form of the database and its interface are outside the scope of RFC 2401. However, RFC 2401 does specify certain minimum management functionality that must be provided, to allow a user or system administrator to control how IPsec is applied to traffic transmitted or received by a host or transiting a security gateway.

The SPD must be consulted during the processing of all traffic (inbound and outbound), including non-IPsec traffic.

In order to support this, the SPD requires distinct entries for inbound and outbound traffic. The SPD contains an ordered list of policy entries. Each policy entry is keyed by one or more selectors that define the set of IP traffic encompassed by this policy entry. One can think of this as separate SPDs (inbound vs. outbound). In addition, a nominally separate SPD must be provided for each IPsec-enabled interface. A SPD must discriminate among traffic that is afforded IPsec protection and traffic that is allowed to bypass IPsec. This applies to the IPsec protection to be applied by a sender and to the IPsec protection that must be present at the receiver. For any outbound or inbound datagram, three processing choices are possible: discard, bypass IPsec, or apply IPsec. The first choice refers to traffic that is not allowed to exit the host, traverse the security gateway, or be delivered to an application at all. The second choice refers to traffic that is allowed to pass without additional IPsec protection. The third choice refers to traffic that is afforded IPsec protection, and for such traffic the SPD must specify the security services to be provided, protocols to be employed, algorithms to be used, etc.

In each IPsec implementation there is a nominal security association database, in which each entry defines the parameters associated with one SA. Each SA has an entry in the SAD. For outbound processing, entries are pointed to by entries in the SPD. Note that if an SPD entry does not currently point to an SA that is appropriate for the packet, the implementation creates an appropriate SA (or SA Bundle) and links the SPD entry to the SAD entry. For inbound processing, each entry in the SAD is indexed by a destination IP address, IPsec protocol type, and SPI. The following parameters are associated with each entry in the SAD. This description does not purport to be a MIB, but only a specification of the minimal data items required to support an SA in an IPsec implementation.

FIG. 1 illustrates a prior art implementation based on RFC 2401 for processing an outbound packet. Processing begins with process block 100, and proceeds to process block 102, wherein a database lookup operation is performed in the security policy database based on the packet to identify the corresponding security policy. If no policy is found as determined in process block 104, then the packet is dropped in process block 106, and processing is complete as indicated by process block 108. Otherwise, in process block 110, a second lookup operation is performed based on the packet, this time in the security association database corresponding to the security policy identified in the previous lookup operation. As determined in process block 112, if a corresponding security association is not located, then in process block 114, the security association is added to the corresponding security association database. In process block 116, the packet is processed according to the corresponding security association. Processing is complete as indicated by process block 118.

RFC 2401 defines a two-step process for performing lookup operations to in order to identify a SA associated with a packet, i.e., by first performing a lookup in a security policy database and then, performing a subsequent second lookup operation based on the identified security policy to identify the corresponding security association). Especially as packet rates and then number of packets to be processed by a packet processor increases, this two-stage lookup process can be limiting. Desired is a new way of performing IPsec identification operations.

SUMMARY

Disclosed are, inter alia, methods, apparatus, data structures, computer-readable medium, mechanisms, and means for storing and searching a hierarchy of policies and associations thereof, which may be particularly useful for implementing security policies and security associations, such as, but not limited to Internet Protocol security (IPsec) in routers, packet switching systems, computers, and/or other devices.

One embodiment performs a lookup operation on multiple associative memory entries of an associative memory based on a lookup word derived from a packet in order to identify a lookup result. These associative memory entries correspond to policies of the hierarchy of policies and associations corresponding to said policies. The associative memory is configured to identify the highest-priority, in a predetermined priority ordering, associative memory entry of the associative memory entries matching the lookup word. These policies are programmed into the associative memory entries such that the hierarchy of the policies matches the predetermined priority ordering of the associative memory entries. Each associative memory entry corresponding to a particular association is programmed into the associative memory entries prior to, in said predetermined priority ordering, the associative memory entry corresponding to the particular association's policy and after any associative memory entry corresponding to another of the policies higher in the hierarchy of policies. The packet is processed based on the lookup result.

In one embodiment, in response to identifying that said highest-priority matching entry corresponds to a particular policy and not to one of the associations, an associative memory entry corresponding to the particular policy is added to the associative memory entries. This added associative memory entry is programmed into the associative memory entries prior to, in the predetermined priority ordering, the associative memory entry corresponding to the particular policy and after any associative memory entry corresponding to another of the policies higher in the hierarchy of policies. In one embodiment, each of the associative memory entries is a ternary content-addressable memory entry. In one embodiment, all of said associative memory entries are searched in parallel based on the lookup word. In one embodiment, each of the policies corresponds to an Internet Protocol security policy, and each of the associations corresponds to an Internet Protocol security association.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 5B illustrates a process used in one embodiment for generating multiple associative memory entries for a corresponding range of values;

FIG. 6A illustrates a process used in one embodiment for processing an inbound packet;

FIG. 6B illustrates a process used in one embodiment for processing an outbound packet;

FIGS. 8A-C and 9A-B illustrate processes used in one embodiment for expanding partitions and redistributing space allocated to partitions.

DETAILED DESCRIPTION

Figure 1:
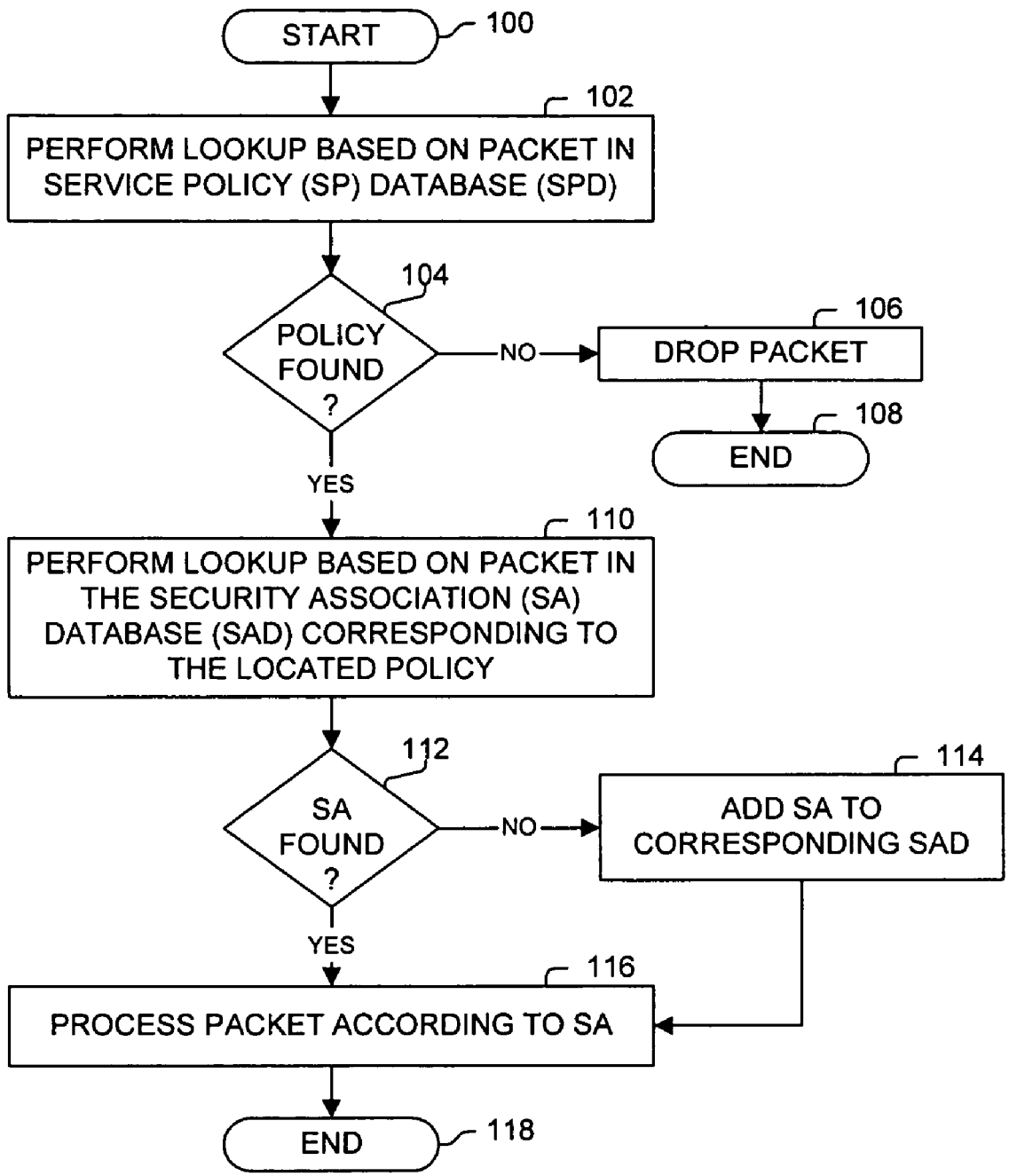
FIG. 1 illustrates a prior art implementation of IPsec.

Disclosed are, inter alia, methods, apparatus, data structures, computer-readable medium, mechanisms, and means for storing and searching a hierarchy of items which may be particularly useful for implementing security policies and security associations, such as, but not limited to Internet Protocol security (Ipsec) for use in routers, packet switching systems, computers, and/or other devices. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments. That may include some elements or limitations of a claim may be performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable medium, mechanisms, and means for storing and searching a hierarchy of items which may be particularly useful for implementing security policies and security associations, such as, but not limited to Internet Protocol security (IPsec) in routers, packet switching systems, computers, and/or other devices.

One embodiment stores a hierarchy of items in a search priority order. Multiple element definitions and groups of elements are identified. Representations of the element definitions and elements are stored in a prioritized searchable data structure in decreasing search priority such that representations of each particular element definition is stored after representations of a set of particular elements associated with the particular element definition and before representations of lower priority element definitions and their associated elements. In one embodiment, the element definitions include Internet Protocol security policies and the elements include Internet Protocol security associations. In one embodiment, the searchable data structure includes an associative memory or a plurality of associative memory entries. In one embodiment, an element definition or element corresponding to a range of values is split into multiple entries. In one embodiment, the hierarchy includes more than two levels, and the element definitions and groups of elements are just two of the more than two levels.

One embodiment maintains a data structure for an identified ordered list of Internet Protocol security policies. Ordered associative memory entries associated with the ordered list of Internet Protocol security policies are programmed into one or more associative memories. Corresponding context memory entries associated with the ordered list of Internet Protocol security policies are programmed into one or more context memories. An associative memory lookup operation is performed on the ordered associative memory entries based on a received packet to identify a particular associative memory entry location. A lookup operation is performed on the context memory based on the particular associative memory entry location to identify a particular Internet Protocol security policy of the ordered list of Internet Protocol security policies. A particular security association entry based on the received packet is added to the ordered associative memory entries, the particular security association entry corresponding to the particular Internet Protocol security policy, and the particular security association entry being added to the ordered associative memory entries prior to the particular associative memory entry location and after other security policy entries of the ordered list of Internet Protocol security policies located prior to the particular associative memory entry location.

One embodiment stores a hierarchy of items in a search priority order. Multiple element definitions and groups of elements are identified. Representations of the element definitions and elements of the groups are stored in a prioritized searchable data structure in decreasing search priority such that representations of each particular element definition is stored after representations of a set of particular elements of the group of elements associated with the particular element definition and before representations of lower priority element definitions and their associated elements.

In one embodiment, the element definitions include Internet Protocol security policies and the groups of elements include Internet Protocol security associations. In one embodiment, the searchable data structure includes an associative memory or multiple associative memory entries. In one embodiment, the searchable data structure includes an associative memory or multiple associative memory entries.

One embodiment that maintains a data structure includes the operations of, or one or more computer-readable media containing computer-executable instructions for performing operations of: identifying an ordered list of Internet Protocol security policies; programming ordered associative memory entries associated with the ordered list of Internet Protocol security policies; programming corresponding context memory entries associated with the ordered list of Internet Protocol security policies; performing an associative memory lookup operation on the ordered associative memory entries based on a received packet to identify a particular associative memory entry location; performing a lookup operation on the context memory based on the particular associative memory entry location to identify a particular Internet Protocol security policy of the ordered list of Internet Protocol security policies; and adding a particular security association entry based on the received packet to the ordered associative memory entries, the particular security association entry corresponding to the particular Internet Protocol security policy, and the particular security association entry being added to the ordered associative memory entries prior to the particular associative memory entry location and after other security policy entries of the ordered list of Internet Protocol security policies located prior to the particular associative memory entry location.

In one embodiment, the operation of adding the particular security association entry includes expanding a partition allocated for entries in an associative memory corresponding to the particular Internet Protocol security policy and its associated security association entries. In one embodiment, the operation of expanding a partition includes redistributing free space to multiple partitions in the associative memory.

One embodiment for searching entries of an associative memory includes: the associative memory; a programming mechanism coupled to the associative memory; and a mechanism for generating lookup words to the associative memory based on which the associative memory performs a lookup operation. The programming mechanism is configured to store representations of element definitions and elements of groups of elements in the associative memory in decreasing search priority such that representations of each particular element definition of the element definitions is stored after representations of a set of particular elements of the groups of elements associated with the particular element definition and before representations of lower-priority element definitions and their associated elements in the groups of elements.

In one embodiment, the element definitions include Internet Protocol security policies and the groups of elements include Internet Protocol security associations. In one embodiment, the programming mechanism includes means for updating the associative memory with new security associations associated with the plurality of security policies. In one embodiment, the programming mechanism includes an update mechanism for updating the associative memory with new security associations associated with the security policies.

One embodiment for storing a hierarchy of items in a search priority order, includes: means for identifying multiple element definitions and multiple groups of elements; and means for storing representations of the element definitions and elements of the groups of elements in a prioritized searchable data structure in decreasing search priority such that representations of each particular element definition of the element definitions is stored after representations of a set of particular elements of the groups of elements associated with the particular element definition and before representations of lower-priority element definitions of the plurality of element definitions and their associated elements in the groups of elements.

In one embodiment, the element definitions includes Internet Protocol security policies and the groups of elements includes Internet Protocol security associations. In one embodiment, the searchable data structure includes an associative memory or multiple associative memory entries. In one embodiment, the means for storing includes means for splitting a range into a plurality of entries.

One embodiment of an apparatus that maintains a data structure based an ordered list of Internet Protocol security policies includes: means for programming ordered associative memory entries associated with the ordered list of Internet Protocol security policies; means for programming corresponding context memory entries associated with the ordered list of Internet Protocol security policies; means for performing an associative memory lookup operation on the ordered associative memory entries based on a received packet to identify a particular associative memory entry location; means for performing a lookup operation on the context memory based on the particular associative memory entry location to identify a particular Internet Protocol security policy of the ordered list of Internet Protocol security policies; and means for adding a particular security association entry based on the received packet to the ordered associative memory entries, the particular security association entry corresponding to the particular Internet Protocol security policy, and the particular security association entry being added to the ordered associative memory entries prior to the particular associative memory entry location and after other security policy entries of the ordered list of Internet Protocol security policies located prior to the particular associative memory entry location.

In one embodiment, said means for adding the particular security association entry includes means for expanding a partition allocated for entries in an associative memory corresponding to the particular Internet Protocol security policy and its associated security association entries. In one embodiment, said means for expanding a partition includes redistributing free space to multiple partitions in the associative memory. In one embodiment, said means for expanding the partition includes means for getting space from neighboring partitions. In one embodiment, said means for expanding the partition includes means for feeing another starving partition. In one embodiment, said means for adding the particular security association entry includes means for splitting the security association entry into a plurality of associative memory entries of said ordered associative memory entries.

One embodiment that maintains entries of an associative memory based an ordered list of Internet Protocol security policies, includes: the associative memory including ordered associative memory entries associated with the ordered list of Internet Protocol security policies; a programming mechanism coupled to the associative memory; a mechanism for generating lookup words to the associative memory based on which the associative memory performs a lookup operation to identify a particular associative memory entry location; and a context memory for performing lookup operations based on the particular associative memory entry location to identify a particular Internet Protocol security policy of the ordered list of Internet Protocol security policies. The programming mechanism is configured to add a particular security association entry based on the received packet to the ordered associative memory entries, the particular security association entry corresponding to the particular Internet Protocol security policy, and the particular security association entry being added to the ordered associative memory entries prior to the particular associative memory entry location and after other security policy entries of the ordered list of Internet Protocol security policies located prior to the particular associative memory entry location.

In one embodiment, the programming mechanism expands a partition allocated for entries in an associative memory corresponding to the particular Internet Protocol security policy and its associated security association entries. In one embodiment, the programming mechanism redistributes free space to multiple partitions in the associative memory. In one embodiment, the programming mechanism is further configured to split a range corresponding to the particular security association entry into a plurality of associative memory entries.

Figure 2A:
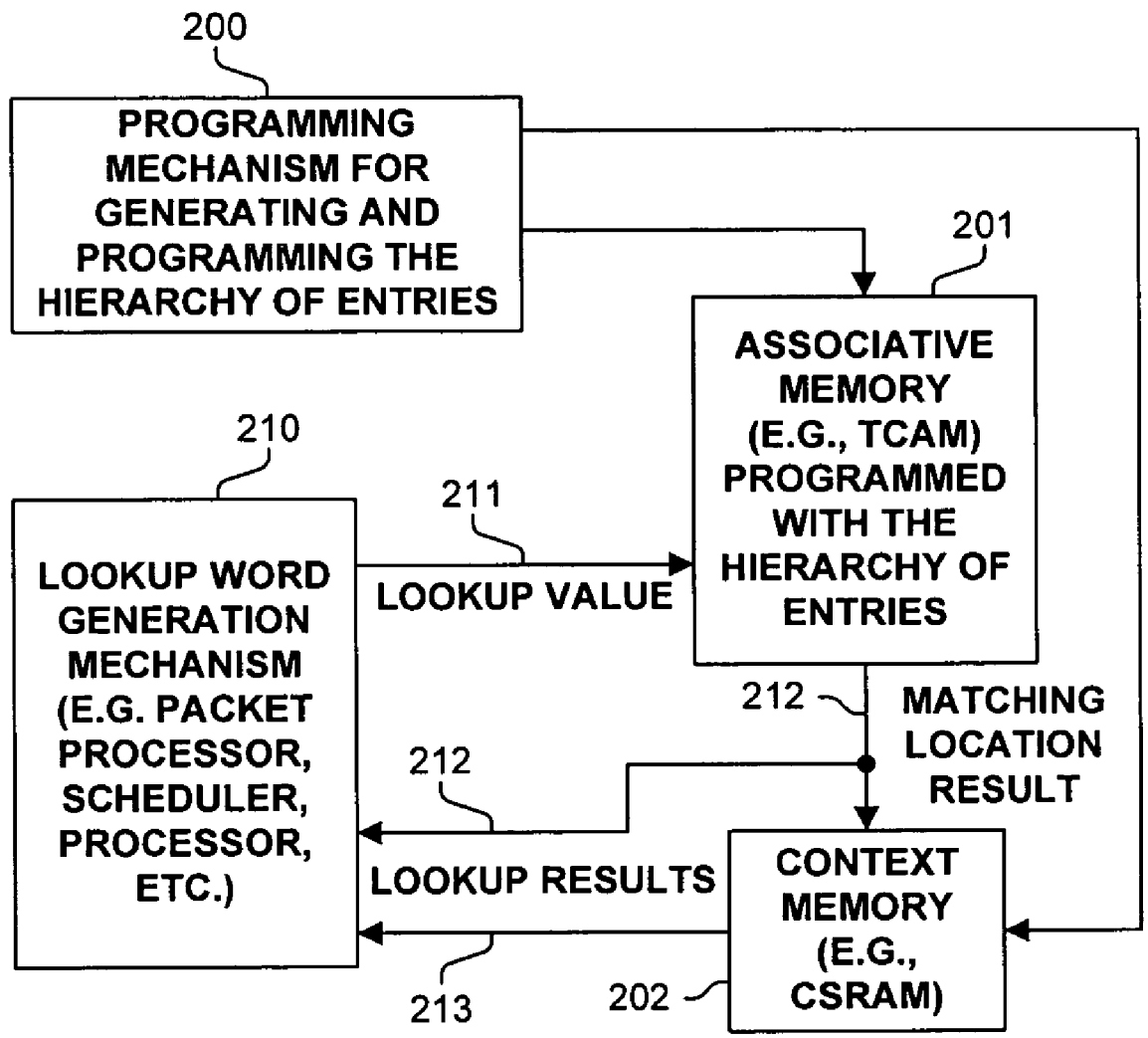
FIG. 2A is a block diagram illustrating one embodiment for storing and searching a hierarchy of items.

FIG. 2A is a block diagram illustrating one embodiment for storing and searching a hierarchy of items. Programming mechanism 200 (e.g., a packet processor, scheduler, processing element, ASIC, circuit, or any other mechanism) generates and programs the hierarchy of entries in one or more associative memories 201 and one or more context memories 202. The number of levels of hierarchy can vary among embodiments, or upon applications thereof. For example, in the context of IPsec, there are two levels (i.e., security policies and security associations). For example, in the context of computer scheduling or processing units, one embodiment uses two levels (e.g., processes and threads within processes). One embodiment, uses three levels (e.g., applications, processes, and threads). The types and number of applications and levels of hierarchy supported is extensible, and these are just a few examples of an unlimited number supported by embodiments.

Lookup word generation mechanism 210 (e.g., a packet processor, scheduler, processing element, ASIC, circuit, or any other mechanism) generates a lookup value 211 for the context in which the embodiment is operating. Associative memory 201 performs a lookup operation based on lookup value 211 to identify matching location result 212. In one embodiment, matching location/lookup result 212 is used. In one embodiment, a lookup operation is performed in context memory 202 based on matching location result 212 to generate lookup result 213.

Figure 2B:
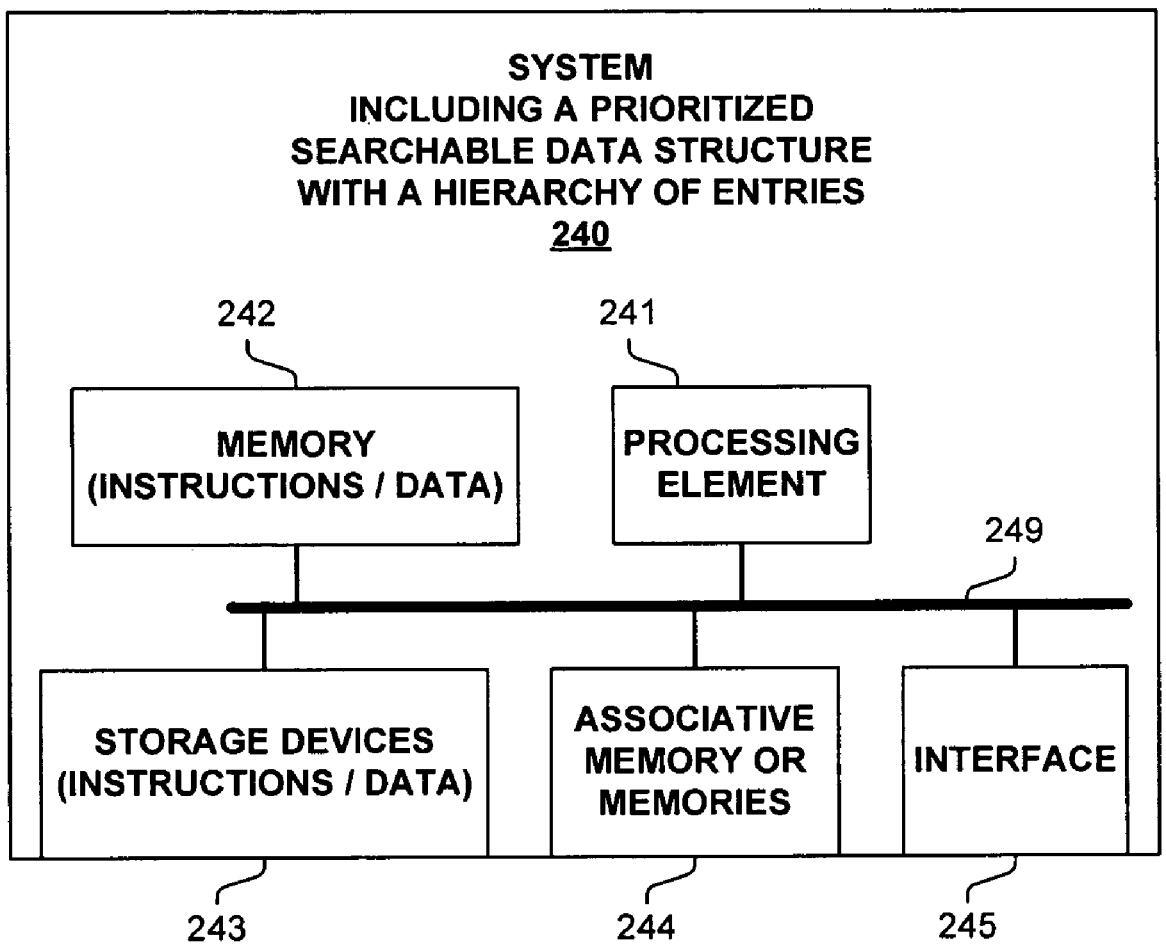
FIG. 2 B is a block diagram illustrating one embodiment for storing and searching a hierarchy of items.

FIG. 2B is a block diagram illustrating one embodiment for storing and searching a hierarchy of items. System 240 includes a prioritized searchable data structure programmed with a hierarchy of entries. System 240 typically includes mechanisms and means for storing and searching a hierarchy of items. For example, one embodiment includes a process corresponding to one of the block or flow diagrams illustrated herein, or corresponding to any other means or mechanism implementing all or part of a claim with other internal or external components or devices possibly implementing other elements/limitations of a claim. Additionally, a single or multiple systems, devices, components, etc. may comprise an embodiment.

In one embodiment, system 240 includes a processing element 241, memory 242, storage devices 243, one or more associative memories 244 and an interface 245 for receiving and transmitting packets or other items, which are coupled via one or more communications mechanisms 249 (shown as a bus for illustrative purposes). Various embodiments of system 240 may include more or less elements. For example, one embodiment does not include an associative memory; rather, the prioritized searchable data structure is stored in memory 242, in storage devices 243, and/or external to system 240, etc.

The operation of system 240 is typically controlled by processing element 241 using memory 242 and storage devices 243 to perform one or more tasks or processes, such as, but not limited to storing and searching a hierarchy of items.

Memory 242 is one type of computer-readable medium, and typically comprises random access memory (RAM), read only memory (ROM), flash memory, integrated circuits, and/or other memory components. Memory 242 typically stores computer-executable instructions to be executed by processing element 241 and/or data which is manipulated by processing element 241 for implementing functionality in accordance with one embodiment of the invention. Storage devices 243 are another type of computer-readable medium, and typically comprise solid state storage media, disk drives, diskettes, networked services, tape drives, and other storage devices. Storage devices 243 typically store computer-executable instructions to be executed by processing element 241 and/or data which is manipulated by processing element 241 for implementing functionality in accordance with one embodiment of the invention.

Figure 3A:
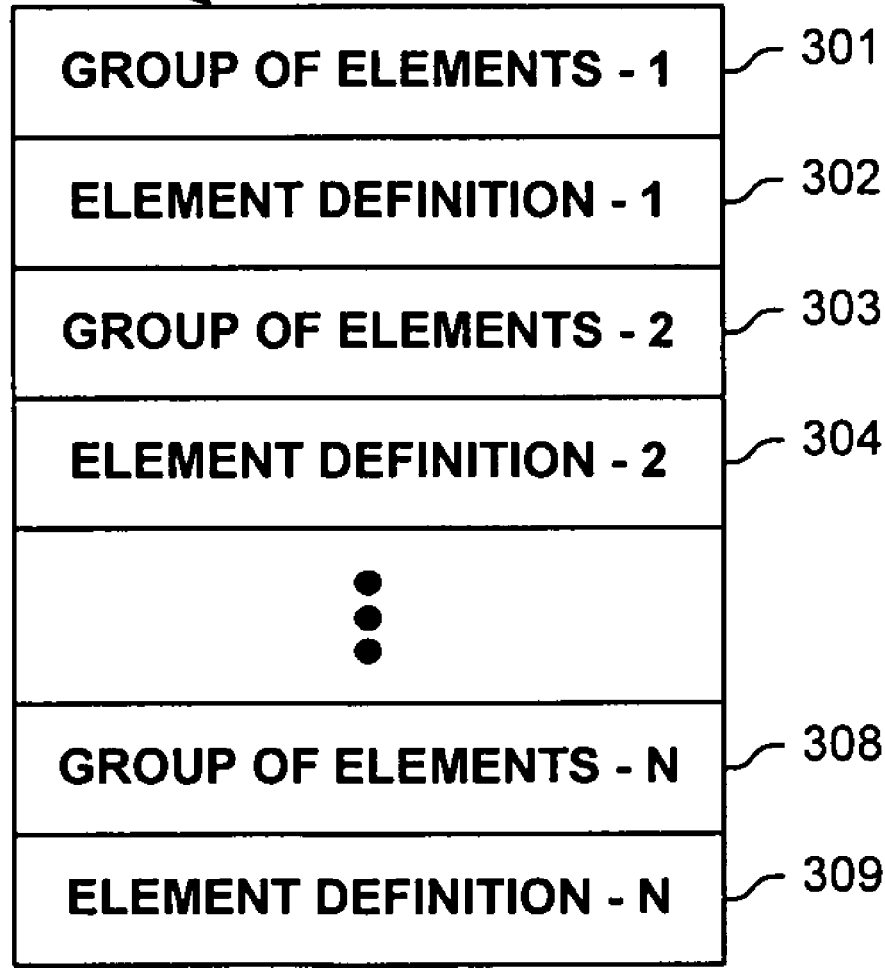
FIG. 3A is a block diagram illustrating a prioritized searchable data structure used in one embodiment.

FIG. 3A is a block diagram illustrating a prioritized searchable data structure 300 used in one embodiment. In one embodiment, data structure 300 is stored in one or more associative memories (with or without corresponding context memories). In one embodiment, data structure 300 is stored in one or more other memories and/or storage devices. Note, in one embodiment, the ordering of the element definitions/security policies matters, while the ordering of elements within the group of elements/security associations does not matter. In one embodiment, however, the ordering of elements within the group of elements/security associations does matter.

As shown, data structure 300 includes multiple entries 301-309, with the prioritized search order as indicated. The first group of one or more elements 301 is stored before the corresponding first element definition 302. A second group of one or more elements 303 is stored before the corresponding second element definition 304, and so on as indicated by the representation of n partitions of elements and their corresponding definitions.

In one embodiment, stored in data structure 300 are representations of element definitions and elements in a prioritized searchable data structure in decreasing search priority such that representations of each particular element definition is stored after representations of a set of particular elements associated with the particular element definition and before representations of lower priority element definitions and their associated elements.

Figure 3B:
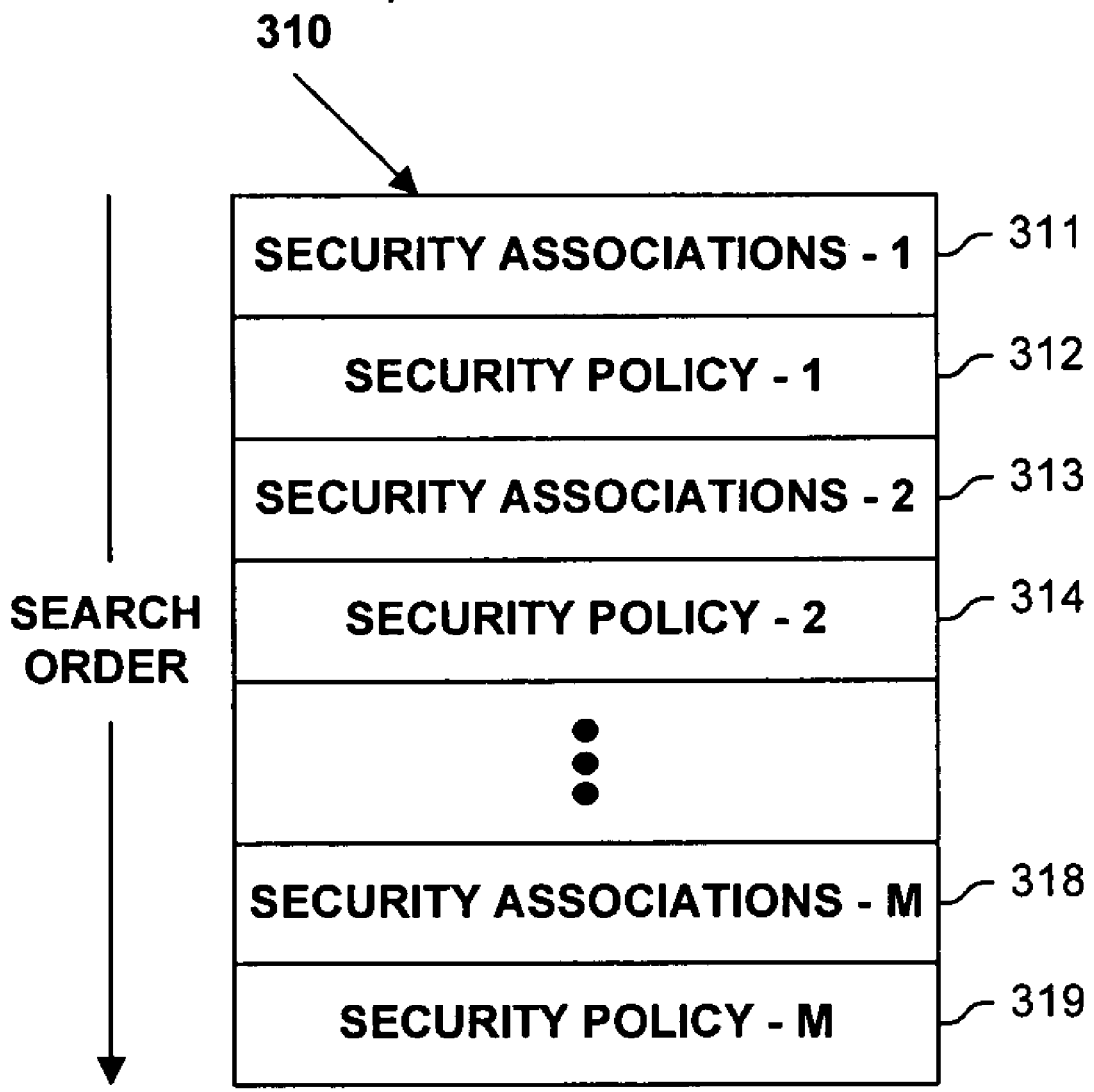
FIG. 3B is a block diagram illustrating a prioritized searchable data structure used in one embodiment.

FIG. 3B is a block diagram illustrating a prioritized searchable data structure 310 used in one embodiment. In one embodiment, data structure 310 is stored in one or more associative memories (with or without corresponding context memories). In one embodiment, data structure 310 is stored in one or more other memories and/or storage devices.

As shown, data structure 310 includes multiple entries 311-319, with the prioritized search order as indicated. The first group of one or more security associations 311 is stored before the corresponding first security policy definition 312. A second group of one or more security associations 313 is stored before the corresponding second security policy definition 314, and so on as indicated by the representation of m partitions of security associations and their corresponding security policy definitions.

In one embodiment, stored in data structure 310 are representations of security policies and security associations in a prioritized searchable data structure in decreasing search priority such that representations of each particular security policy is stored after representations of a set of particular security associations associated with the particular security policy and before representations of lower priority security policies and their associated security associations.

Figure 3C:
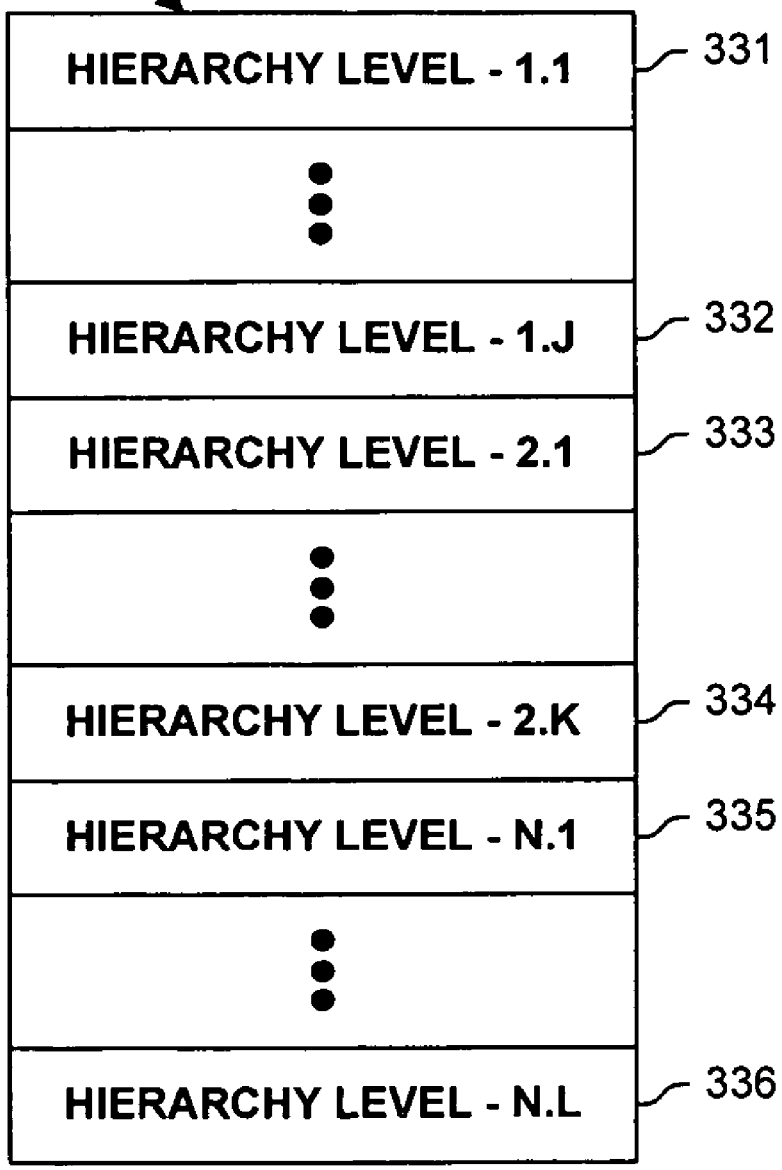
FIG. 3C is a block diagram illustrating a prioritized searchable data structure used in one embodiment.

FIG. 3C is a block diagram illustrating a prioritized searchable data structure 330 used in one embodiment. In one embodiment, data structure 330 is stored in one or more associative memories (with or without corresponding context memories). In one embodiment, data structure 330 is stored in one or more other memories and/or storage devices. Note, in one embodiment, the ordering of the items within each of the hierarchy level groups 331-336 matter; while, in one embodiment, the ordering of the items within at least one of the hierarchy level groups 331-336 does not matter.

As shown, data structure 300 includes N hierarchy levels to emphasize that one embodiment supports two or more levels of hierarchy, with the prioritized search order as indicated. Within a particular hierarchy level, there may be the same or different number of groups. For example and as shown, hierarchy level 1 includes J groups of entries in a prioritized search order, hierarchy level 2 includes K groups of entries in a prioritized search order, and hierarchy level N includes L groups of entries in a prioritized search order. Note, in one embodiment, the values of J, K, and L are different. While in one embodiment, at two of the values of J, K, and L are the same. Also, in one embodiment, element definitions and groups of elements may be programmed in any of the groups 331-336 as long as the required hierarchy corresponding to the desired search order is maintained. In one embodiment, there are multiple levels of element definitions. In one embodiment, there are multiple levels of elements. In one embodiment, the element definitions are always in the lowest priority group 332, 334, and 336 within each of the hierarchy levels. In one embodiment, the elements are always in the highest search priority groups 331, 333 and 335, while the other groups included multiple levels of element definitions. In one embodiment, groups 331-336 only include element definitions. In one embodiment, groups 331-336 only include elements (and/or representations of any other items).

For example, the hierarchy levels and groups illustrated in FIG. 3C are used in one embodiment to store N hierarchy levels of groups entries for classifying animals. Each hierarchy level could include groups of (1) species, (2) genus, (3) family, (4) order, (5) class, (6) phylum, and (7) kingdom, in the search order of one to seven. Thus, when a search is performed, the species will be identified if it is known. Otherwise, the first matching entry of corresponding genus, family, order, class, phylum or kingdom will be identified (in the programmed order). Additionally, in one embodiment, the hierarchy levels and groups illustrated in FIG. 3C are used to store N hierarchy levels of groups entries for identifying a matching thread, else process, else application, else user, etc. (or some variant thereof).

Figure 4:
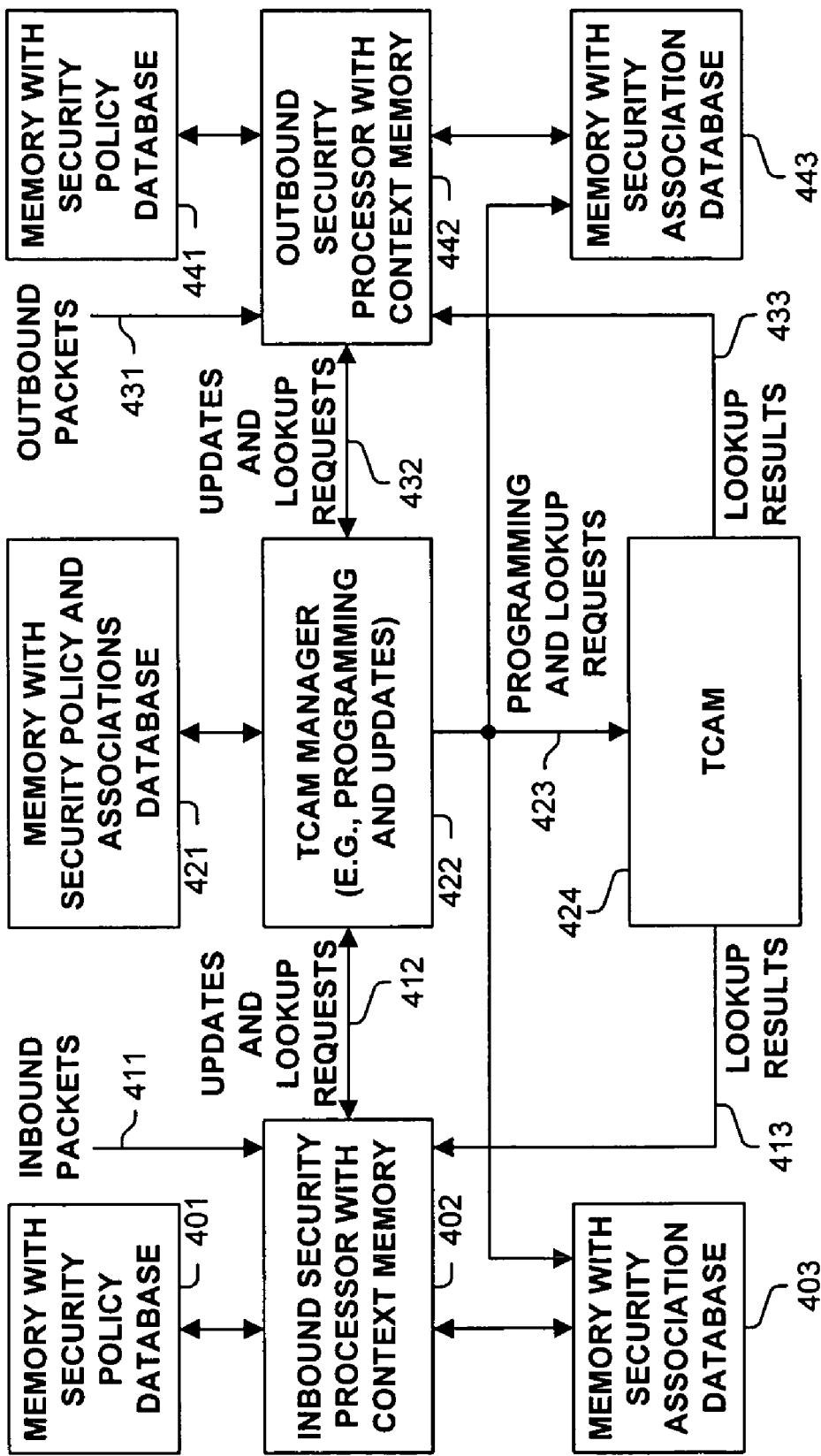
FIG. 4 is a block diagram illustrating one embodiment for storing and searching a hierarchy of items of particular use with IPsec.

FIG. 4 is a block diagram illustrating one embodiment for storing and searching a hierarchy of items of particular use with IPsec and using one or more ternary content addressable memories depicted as TCAM 424. In one embodiment, another type of associative memory is used. Even though FIG. 4 uses the specific label of TCAM, another type of the extensible types of associative memories (e.g., CAM) is used in one embodiment. TCAM manager 422 programs and updates TCAM 424 and context memories within inbound security processor with context memory 402 and within outbound security processor with context memory 442. In one embodiment, TCAM manager 422 uses memory 421 which stores security policy and associations database in programming one or more associative memories 424 and corresponding context memories.

In one embodiment, inbound security processor 402 only performs a lookup operation in TCAM for clear-packet SP searches as indicated by RFC 2401; while in one embodiment, a different search mechanism is employed as the architecture depicted in FIG. 4 is extensible to meet the needs of a particular application. Note, in one embodiment, the contents of a particular database may be replicated in order to optimize lookup (e.g., for inbound and for outbound packets) and/or update actions.

In one embodiment, inbound security processor 402 receives inbound packets 411 and generates lookup requests included in updates and lookup requests 412. TCAM manager 422, either immediately or after storing a lookup request, generates the appropriate lookup word if not already provided by inbound security processor 402. This lookup word is communicated in programming and lookup requests 423 to TCAM 424, which performs the associative memory lookup operation to generate lookup result 413, which is used to perform a lookup operation in the context memory within inbound security processor 402.

In one embodiment, the context memory within inbound security processor 402 includes an array of pointers/indices indexed by the TCAM match address included in lookup results 413. Inbound security processor 402 use the pointer/ index from that array to locate the SPD entry. Thus, when the SP search is completed, inbound security processor 402 uses the TCAM match location as an index into an array of SP entries in the context memory, with one or more entries possibly pointing to the same SP in memory 401 storing a copy of the SP database (SPD).

In one embodiment, a context memory is not used. Rather, the SPD maintained in memory 401 is indexed directly by the TCAM match index, with duplicate SPs in the array, and null entries (or other indications) for indices that do not refer to SPs.

In one embodiment, the SPD stored in memory 401 is maintained as an array of bytes. Each byte corresponds to the TCAM entry with the same index and contains the desired action when a clear packet is matched to its associated TCAM entry. The allowed actions include: to drop, to pass, and to secure. If the action is to secure the packet, a SA tunnel will be set up. When an SP is set up, TCAM manager 422 must initiate the corresponding SP in the SPD. In one embodiment, such an update request 412 is communicated to the inbound security processor 402, which updates memory 401.

One embodiment includes a security association database (SAD) stored in memory 403. In one embodiment, the SAD is implemented as an array indexed by the security policy index (SPI). In one embodiment, the seventeen least significant bits of the SPI are used; while in one embodiment, another set of bytes are used. When a packet with a valid IPSec header arrives, its SPI is extracted and indexed into the SAD. TCAM manager 422 also sets up these SA entries when they are inserted.

In one embodiment, output bound security processor 442 uses TCAM 424 for matching both security policies and service associations. Ordered associative memory entries associated with the ordered list of Internet Protocol security policies are programmed into one or more associative memories 424 and corresponding context memory entries are programmed in the context memory of outbound security processor 442.

In one embodiment, the hierarchy of security policies and security associations are stored in TCAM 424 such that security association entries corresponding to a particular security policy are stored before the particular security policy, and security policies are stored in their prioritized order. In one embodiment, security associations associated with a security policy are stored after entries corresponding to all higher priority security policies (and their respective security associations); while in one embodiment, this ordering is not required. Thus, in one embodiment, a single lookup operation in TCAM 424 can be used to identify a security association corresponding to the highest priority security policy if one exists, otherwise the security policy itself will be identified.

In one embodiment, an associative memory lookup operation is initiated by outbound security processor 442 based on a received outbound packet 431 to identify a particular associative memory entry location (e.g., included in lookup results 433). A lookup operation is then performed in the context memory based on the particular associative memory entry location to identify a particular Internet Protocol security policy of the ordered list of Internet Protocol security policies or one of the security associations. If a security policy is identified, TCAM manager 432 adds a particular security association entry based on the received packet is added to the TCAM prior to the particular associative memory entry location identified during the lookup operation (i.e., the entry corresponding to the matching security policy) and after entries corresponding to security policy of higher priority.

In one embodiment, the context memory in outbound security processor with context memory 442 includes pointers/indices to SPs and SAs (e.g., similar to the pointer array previously described herein). In one embodiment, outbound security processor 442 maintains a direct array of intermixed SPs and SAs indexed by TCAM match address. In one embodiment, the SP information includes a reference id, and information related to treatment on match: drop, pass, or initiate a tunnel. In one embodiment, the SA information contents requires multiple cache lines, which by including enough memory on outbound security processor 442, the latter scheme can be used while avoiding the extra memory transaction per-packet. Additionally, one embodiment also includes a mechanism to determine when elements should be removed.

One embodiment includes outbound security processor 442 (which includes a context array that also serves as the SPD), a memory with security policy database 441, and a memory with security association database (SAD) 443. In one embodiment, two security association databases are used to enhance performance. Outbound security processor 442 processes each outbound packet by first extracting the five selectors specified in RFC 2401, and then performing a search for a match in TCAM 424. If a match is found, outbound security processor 442 indexes the context array using the index of the matched TCAM entry included in lookup results 433. The context array entry indicates whether the TCAM match corresponds to a matching SA or SP. If it is a SP, the context array also consists of the appropriate action for packet matching that SA. If it is a SA, the context array contains the index into the SAD for the corresponding SA. There is only one data structure of outbound SA.

Figure 5A:
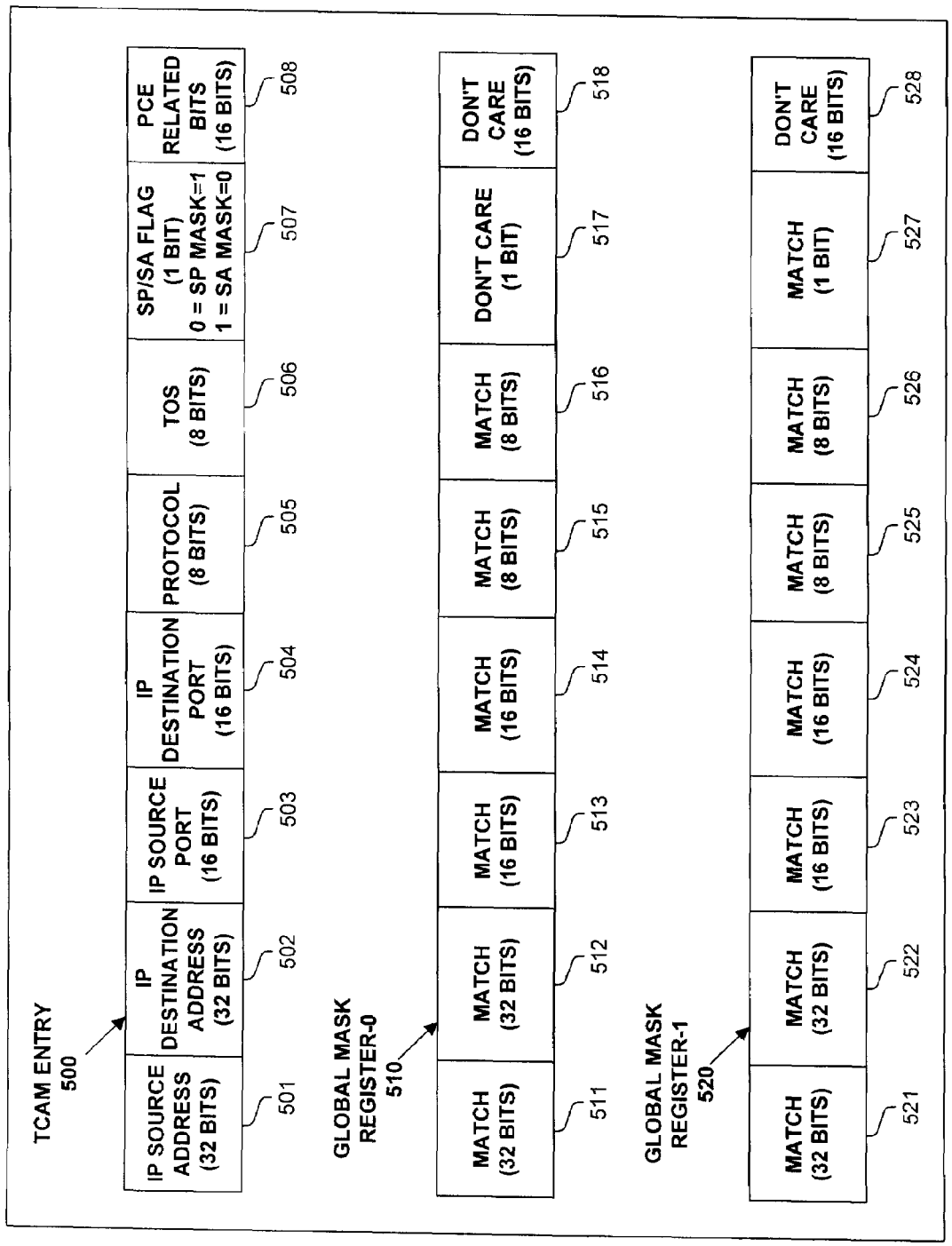
FIG. 5A illustrates associative memory entries used in one embodiment.

FIG. 5A illustrates associative memory entries used in one embodiment. As shown, TCAM entry 500 includes a source address field 501, a destination address field 502, a source port field 503, a destination port field 504, a protocol type field 505, a service indication field 506, an entry type field 507 to indicate whether the entry is a SA or SP entry, and an implementation specific field 508. Note, one embodiment sets the mask field to don't care in field 507 if the entry corresponds to a service policy because every search is performed on the SPD (e.g., on all SP entries). By not masking out the value when the entry corresponds to an SA, then either all entries can be searched or only SPs can be searched. Thus, global mask register-0 510 has bits set to match in fields 511-516 and to ignore (i.e., don't card) in fields 517-518. Thus, using global mask register-0 510 in a search will cause both SP and SA entries to be searched. Global mask register-1 520 has bits set to match in fields 521-527 and to ignore (i.e., don't card) in field 528. Thus, using global mask register-1 520 in a search with the lookup word specifying SP entry types, a search will cause only SP entries to be searched. Note, the use of block masks are described in Ross et al., "Block Mask Ternary CAM," U.S. Pat. No. 6,389,506, issued May 14, 2002, which is hereby incorporated by reference.

FIG. 5B illustrates a process used in one embodiment for generating multiple associative memory entries for a corresponding range of values. Some applications desire to match on a range of values (e.g., source port number 72-83).

Because TCAMs do not support arbitrary sets or ranges as selection criteria, the splitter is required to perform any required entry expansion. For example, implementing the destination port ranges <25 and >25 requires splitting a single entry into sixteen entries. FIG. 5B illustrates pseudo code of a mechanism used in one embodiment to split entries into multiple entries. The splitter converts a SP specified in a range-set format into a SP specified in an expanded form using a collection of matching values and don't-care mask. For example, support a range of 1 to 15 becomes 4 sets of (matching values, don't care mask): (0×1, 0×e), (0×2, 0×d), (0×4, 0×b), and (0×8, 0×7). As shown, first, the TCAM entry d . . . d is checked to see if it matches a subset of the values covered by the range. If not, then the process is repeated with 0d . . . d and 1d . . . d. This happens recursively (using the stacks—not function recursion). Branches are trimmed when the entry being tested matches a disjoint set of values. Entries are saved when they match a subset of the values matched by the range. Entries that match overlapping sets are split and pushed onto the work stack.

FIG. 6A illustrates a process used in one embodiment for processing an inbound packet. Processing begins with process block 600, and proceeds to process block 602, wherein a packet is received. As determined in process block 604, if the packet is marked as conforming to IPsec, then in process block 606 the packet is processed, and processing is completed as indicated by process block 619. Otherwise, in process block 610, a lookup word is generated based on the received packet (e.g., with fields in accordance to those stored in the associative memory or other implementations of the data structure). In process block 612, a lookup operation is initiated and performed in the associative memory using the lookup word and a global mask register such that only SP entries are searched. The lookup result is received and a lookup operation based on the result is performed in the context memory in process block 614. Then, in process block 616, the packet is processed according to the action identified in the context memory. Processing is complete as indicated by process block 619.

FIG. 6B illustrates a process used in one embodiment for processing an outbound packet. Processing begins with process block 640, and proceeds to process block 642, wherein a packet is received. Next, in process block 644, a lookup word is generated based on the received packet. ). In process block 646, a lookup operation is initiated and performed in the associative memory using the lookup word and a global mask register such that both SP and SA entries are searched. The lookup result is received and a lookup operation based on the result is performed in the context memory in process block 648. As determined in process block 650, if the entry matched corresponds to an SA entry, then in process block 652, the action to perform is identified in the SAD based on the lookup result retrieved from the context memory, and the packet is processed according to the identified action. Otherwise, in process block 660, the packet is processed according to the action identified by the context memory; and in process block 662, a security access entry is added to the SAD and the associative and context memories are updated accordingly. Processing is complete as indicated by process block 669.

Figure 7:
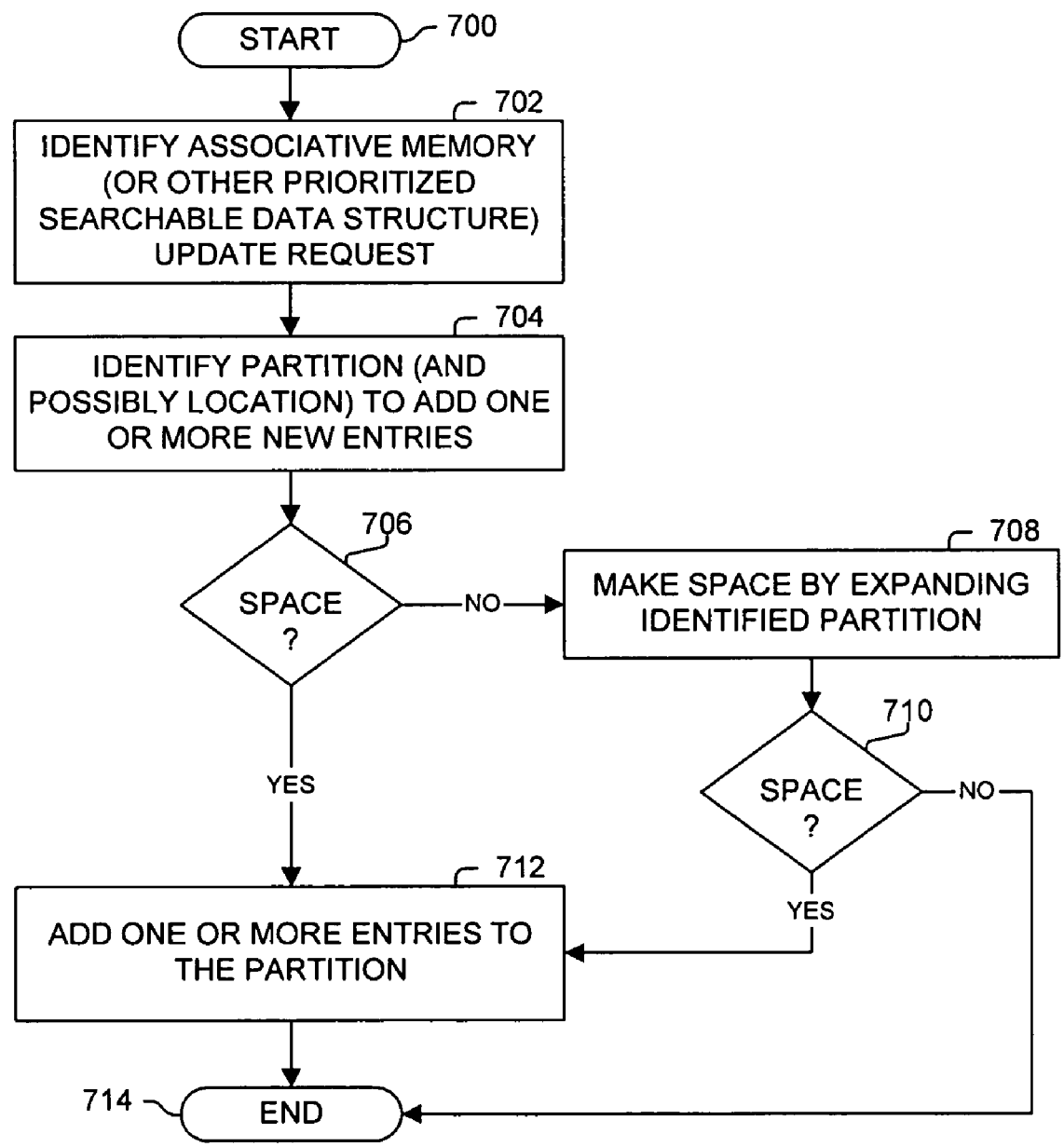
FIG. 7 illustrates a process used in one embodiment for adding an entry to an ordered list of associative memory entries.

FIG. 7 illustrates a process used in one embodiment for adding an entry to an ordered list of associative memory entries. Processing begins with process block 700, and proceeds to process block 702, wherein an associative memory or other prioritized searchable data structure update request is identified. Next, in process block 704, the partition and possibly the exact location(s) to add one or more entries entry are identified. As determined in process block 706, if there is space to add the one or more entries in the identified partition, then the entries are added in process block 712. Otherwise, space for the new entries is made (or attempted to be made) in process block 708. As determined in process block 710, if this expansion of the partition was successful, then the then the entries are added in process block 712. Otherwise, there is no room for the entries and an error condition is generated. Processing is complete as indicated by process block 714.

FIGS. 8A-D and 9A-D illustrate processes used in one embodiment for expanding partitions and redistributing space allocated to partitions. Note, these processes may call each in a recursive or other fashion to expand/shrink partitions to redistribute the free space among partitions. One embodiment attempts to maintain an even distribution of free space (or something approximating such) across all partitions to minimize the amount of adjusting to be performed in adding one or more entries to a partition. By maintaining an approximate even distribution of free space among partitions, a single insert of an element or element definition (which may include one or more associative memory entries) can be quickly performed and limits the worst-case insertion time, which is important for applications with high update rates. Note, one embodiment does not attempt to maintain an even distribution of free space, which may be practical for an application with a relatively low insertion rate, especially when compared to the worst-case insertion time.

In one embodiment, when a partition requires space or is starving (e.g., not out of space, but is desirable to increase its space for future additions), it acquires space from a neighboring partition or partitions, and possibly these acquire space from a neighboring partition of there, etc. Some of the free space may be reallocated during this or another process to feed starving partitions. Of course, one embodiment uses another mechanism for expanding partitions and redistributing space.

Figure 8A:
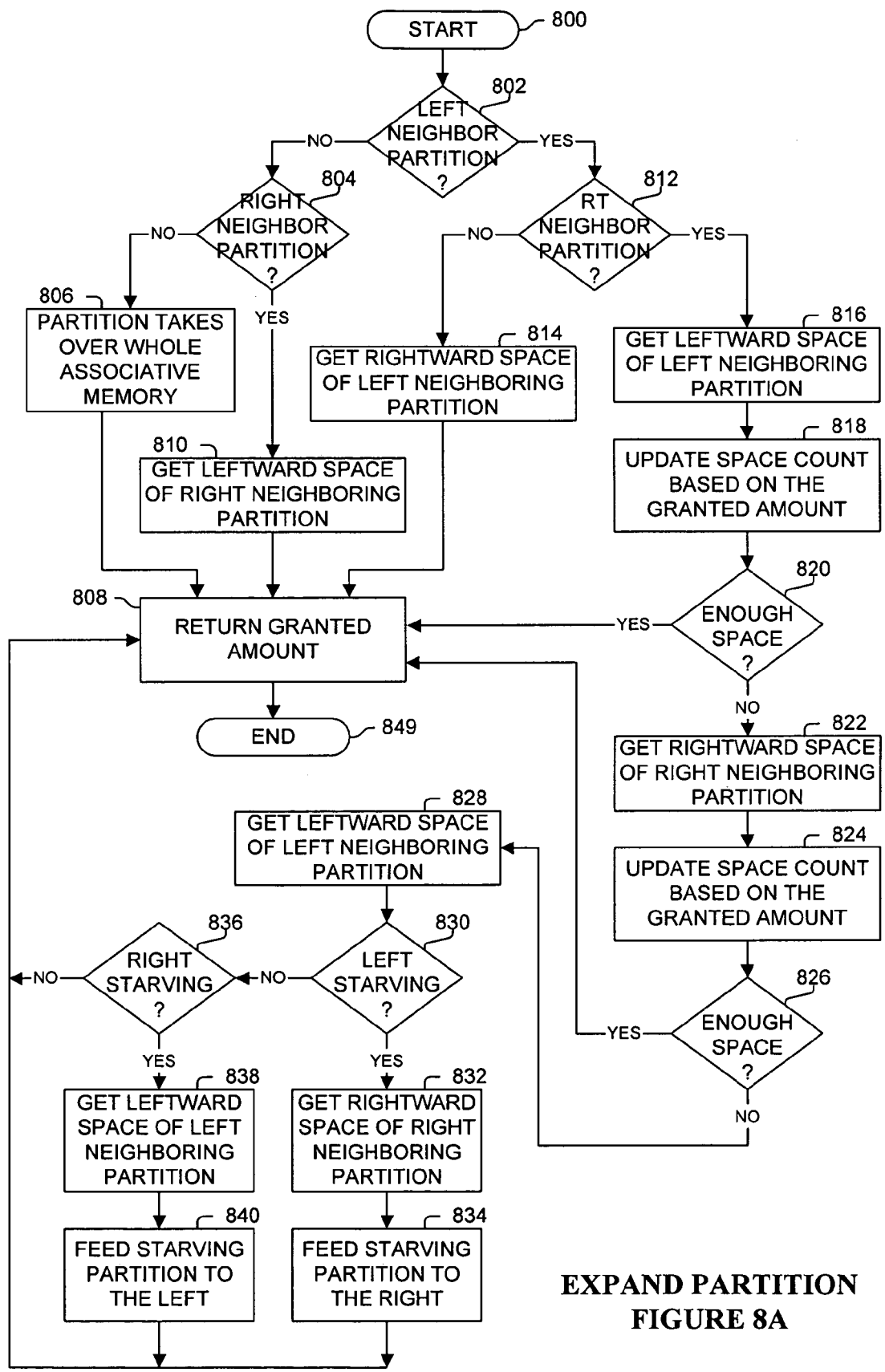

FIG. 8A illustrates a process used in one embodiment to expand a partition. Processing begins with process block 800. As determined in process block 802, if the partition to increase in size corresponds does not have a left neighboring partition, then as determined in process block 804, if the partition has a right neighboring partition, then leftward space is acquired from the neighboring right partition in process block 810. Otherwise, in process block 806, it has been identified as the only partition and the partition acquires the whole associative memory space available for use as the hierarchical database.

Otherwise, it was determined in process block 802 that the partition has a left neighboring partition. As determined in process block 812, if the partition does not have a right neighboring partition, then in process block 814, rightward space of the left neighboring partition. Otherwise, in process block 816, leftward space of left neighboring partition is acquired. In process block 818, the space count for the partition is updated based on the acquired space.

As determined in process block 820, if enough space has been acquired, then processing proceeds to process block 808. Otherwise, in process block 822, rightward space of the right neighboring partition is acquired, and in process block 824, the space count for the partition is updated based on the acquired space.

As determined in process block 826, if enough space has been acquired, then processing proceeds to process block 808. Otherwise, in process block 828, leftward space of the left neighboring partition is acquired.

As determined in process block 830, if the partition to the left is starving (e.g., has less or significantly less free space the average free space across partitions), then in process block 832, rightward space of the right neighboring partition is acquired, and it is fed to the starving partition to the right in process block 834.

As determined in process block 836, if the partition to the right is starving (e.g., has less or significantly less free space the average free space across partitions), then in process block 838, leftward space of the left neighboring partition is acquired, and it is fed to the starving partition to the left in process block 840.

Finally, the amount of space granted to the partition is returned in process block 808, and processing is complete as indicated by process block 849.

FIG. 8B illustrates a process used in one embodiment to get leftward space from a partition. Processing begins with process block 850, and proceeds to process block 852, wherein the available space in the current partition is computed. As determined in process block 854, if there is extra space, then in process block 856, this partition is shrunk to free up space for other partition. Otherwise, in process block 858, the partition determines whether it is starving (e.g., needs more space) and updates its status accordingly.

Next, as determined in process block 860, are there more partitions to the left to examine to get the needed space, then in process block 862, the partition to the left is selected and processing returns to process block 852. Otherwise, in process block 864, entries in the current partition are flushed/shifted to the left. In one embodiment, all the elements/SAs and definitions/SPs are moved tight against its neighbor so there is no free space in between them. As determined in process block 866, if the current partition is not the original partition, then in process block 868, the next partition to the right is selected and processing returns to process block 864. Otherwise, in process block 870, the granted amount of space and the starvation status is returned. Processing is complete as indicated by process block 872.

Figure 8C:
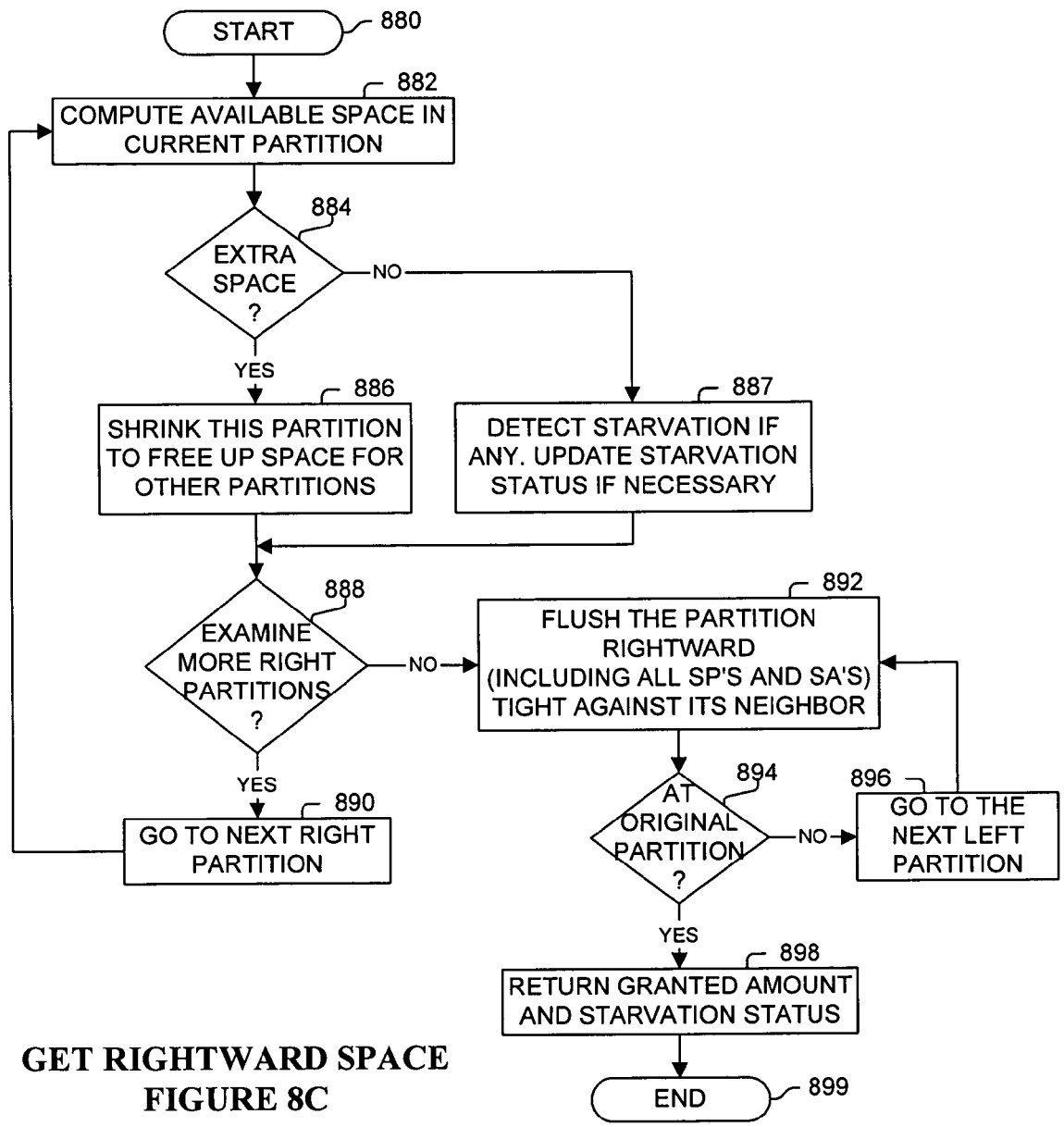

FIG. 8C illustrates a process used in one embodiment to get rightward space from a partition. Processing begins with process block 880, and proceeds to process block 882, wherein the available space in the current partition is computed. As determined in process block 884, if there is extra space, then in process block 886, this partition is shrunk to free up space for other partition. Otherwise, in process block 887, the partition determines whether it is starving (e.g., needs more space) and updates its status accordingly.

Next, as determined in process block 888, are there more partitions to the right to examine to get the needed space, then in process block 890, the partition to the right is selected, and processing returns to process block 882. Otherwise, in process block 892, entries in the current partition are flushed/shifted to the right. In one embodiment, all the elements/SAs and definitions/SPs are moved tight against its neighbor so there is no free space in between them. As determined in process block 894, if the current partition is not the original partition, then in process block 896, the next partition to the left is selected and processing returns to process block 892. Otherwise, in process block 898, the granted amount of space and the starvation status is returned. Processing is complete as indicated by process block 899.

Figure 9A:
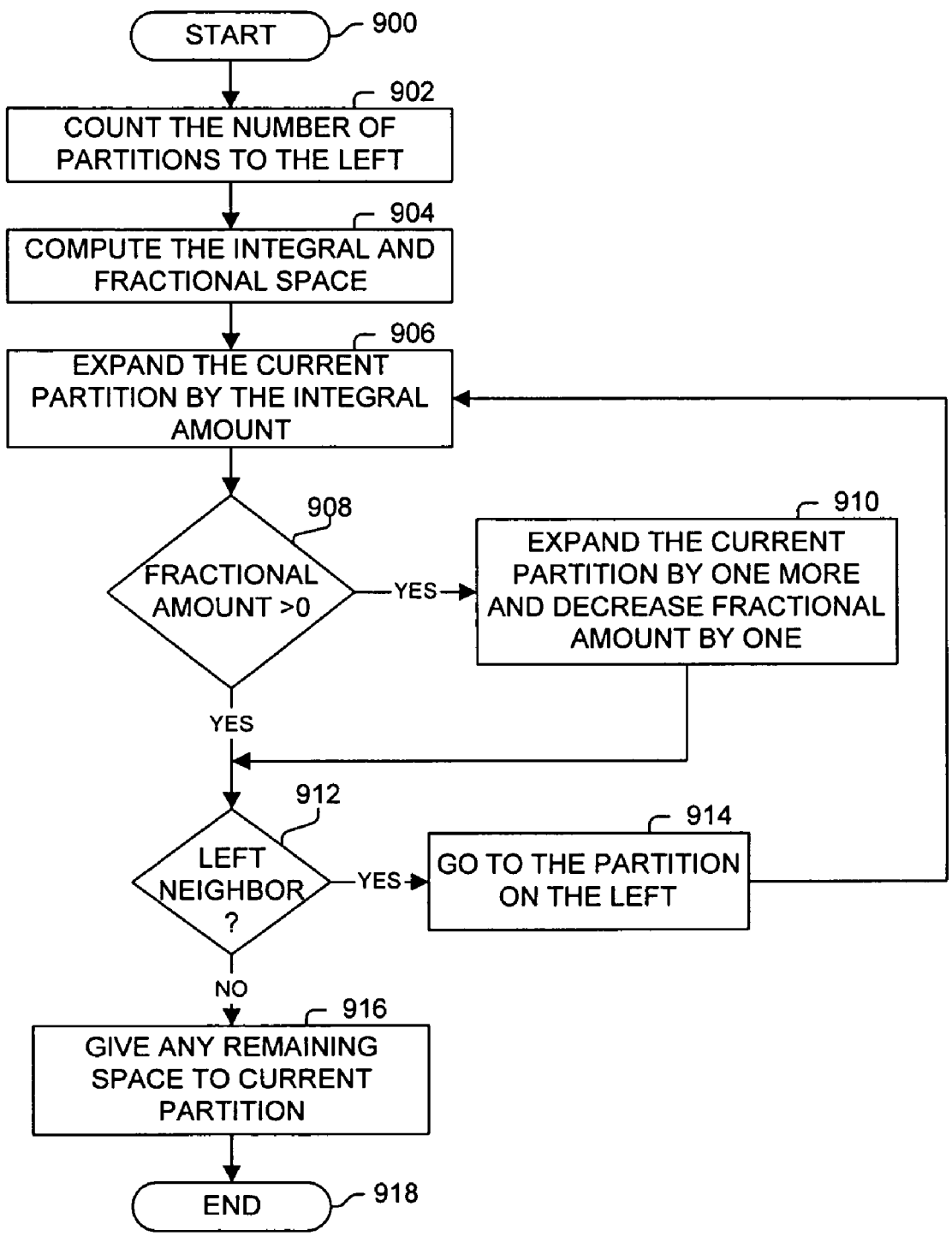

FIG. 9A illustrates a process used in one embodiment to feed a left starving partition. Processing begins with process block 900, and proceeds to process block 902, wherein the number of partitions to the left are counted. The integral and fractional values of the free space are computed in process block 904. The current partition is expanded by the integral amount in process block 906. If there is a fractional amount left for the current partition as determined in process block 908, then the current partition is expanded by one more entry and the fractional amount is decreased by one in process block 910. As determined in process block 912, if there is a left neighbor remaining, then in process block 914, the left neighbor partition is selected, and processing returns to process block 906. Otherwise, in process block 916, if there is any more remaining free space, it is given to the current partition. Processing is complete as indicated by process block 918.

Figure 9B:
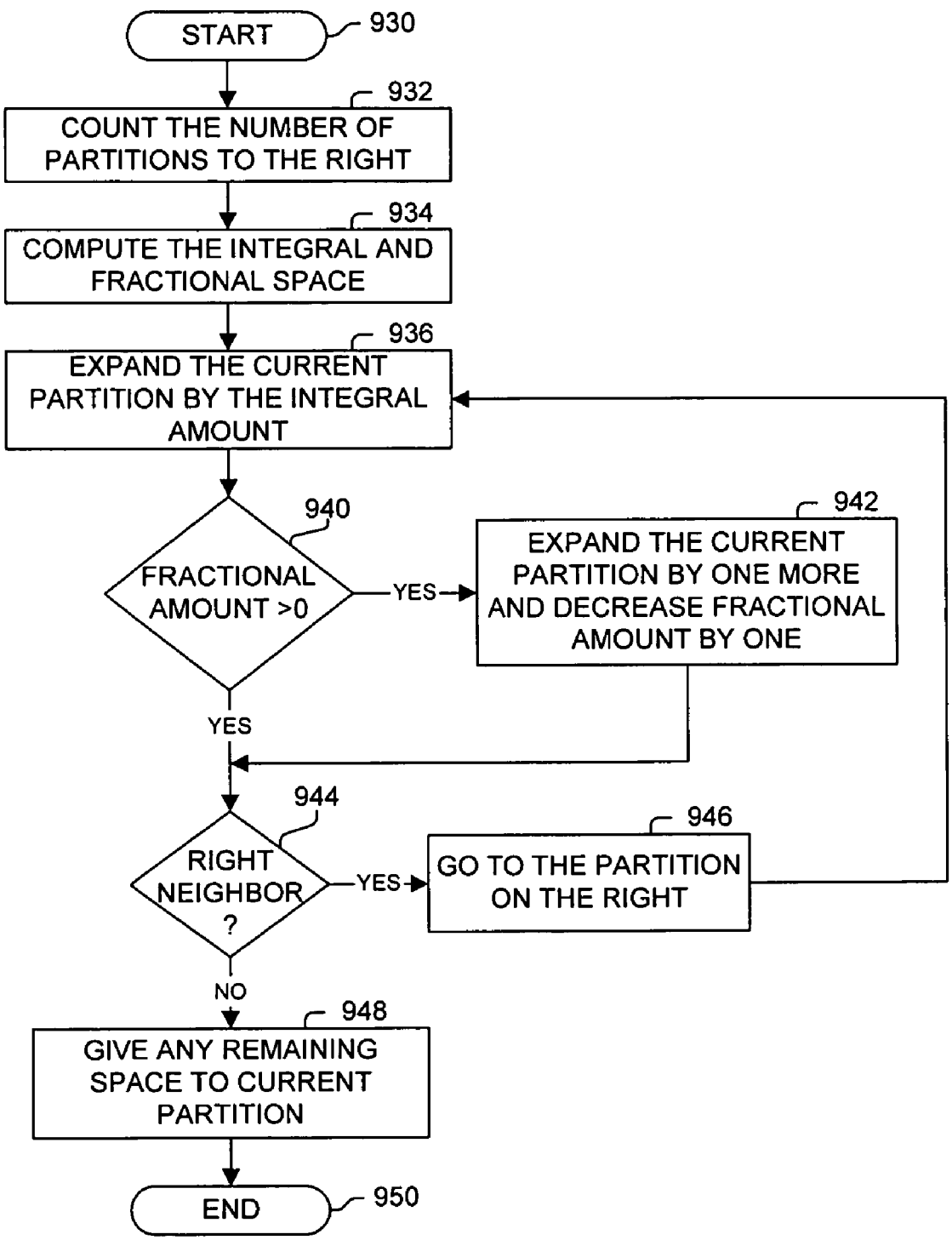

FIG. 9B illustrates a process used in one embodiment to feed a right starving partition. Processing begins with process block 930, and proceeds to process block 932, wherein the number of partitions to the right are counted. The integral and fractional values of the free space are computed in process block 934. The current partition is expanded by the integral amount in process block 936. If there is a fractional amount left for the current partition as determined in process block 940, then the current partition is expanded by one more entry and the fractional amount is decreased by one in process block 942. As determined in process block 944, if there is a right neighbor remaining, then in process block 946, the left neighbor partition is selected, and processing returns to process block 936. Otherwise, in process block 948, if there is any more remaining free space, it is given to the current partition. Processing is complete as indicated by process block 950.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for processing packets based on a hierarchy of policies, the method comprising:
    performing a lookup operation on a plurality of associative memory entries of an associative memory based on a lookup word derived from a packet in order to identify a lookup result, the associative memory entries corresponding to a plurality of policies of the hierarchy of policies and a plurality of associations corresponding to said policies, wherein the associative memory is configured to identify the highest-priority, in a predetermined priority ordering, associative memory entry of the associative memory entries matching the lookup word, with said policies programmed into said associative memory entries such that said hierarchy of the policies matches said predetermined priority ordering of the associative memory entries, with each associative memory entry corresponding to a particular association of the plurality of associations being programmed into said associative memory entries prior to, in said predetermined priority ordering, the associative memory entry corresponding to the particular association's policy of said policies and after any associative memory entry corresponding to another of said policies higher in said hierarchy of policies; and
    processing the packet based on the lookup result.

2. The method of claim 1, comprising in response to identifying that said highest-priority matching entry corresponds to a particular policy of said policies and not to one of said associations, adding an associative memory entry corresponding to the particular policy to said associative memory entries; wherein said added associative memory entry is programmed into said associative memory entries prior to, in said predetermined priority ordering, the associative memory entry corresponding to the particular policy and after any associative memory entry corresponding to another of said policies higher in said hierarchy of policies.

3. The method of claim 2, wherein each of the associative memory entries is a ternary content-addressable memory entry.

4. The method of claim 2, wherein all of said associative memory entries are searched in parallel based on the lookup word.

5. The method of claim 2, wherein each of said policies corresponds to an Internet Protocol security policy, and each of said associations corresponds to an Internet Protocol security association.

6. The method of claim 1, wherein each of the associative memory entries is a ternary content-addressable memory entry.

7. The method of claim 1, wherein all of said associative memory entries are searched in parallel based on the lookup word.

8. The method of claim 1, wherein each of said policies corresponds to an Internet Protocol security policy, and each of said associations corresponds to an Internet Protocol security association.

9. An apparatus for processing packets based on a hierarchy of policies, the apparatus comprising:
    a plurality of associative memory entries of an associative memory, the associative memory entries being programmed to correspond to a plurality of policies of the hierarchy of policies and a plurality of associations corresponding to said policies, wherein the associative memory is configured to identify the highest-priority, in a predetermined priority ordering, associative memory entry of the associative memory entries matching a lookup word, with said policies programmed into said associative memory entries such that said hierarchy of the policies matches said predetermined priority ordering of the associative memory entries, with each associative memory entry corresponding to a particular association of the plurality of associations being programmed into said associative memory entries prior to, in said predetermined priority ordering, the associative memory entry corresponding to the particular association's policy of said policies and after any associative memory entry corresponding to another of said policies higher in said hierarchy of policies; and
    a packet processing mechanism for initiating a lookup operation on the plurality of associative memory entries based on the lookup word derived from a packet in order to identify a lookup result, and to process the packet based on the lookup result.

10. The apparatus of claim 9, wherein the packet processing mechanism is configured to, in response to identifying that said highest-priority matching entry corresponds to a particular policy of said policies and not to one of said associations, cause an associative memory entry corresponding to the particular policy to be added to said associative memory entries; wherein said added associative memory entry is programmed into said associative memory entries prior to, in said predetermined priority ordering, the associative memory entry corresponding to the particular policy and after any associative memory entry corresponding to another of said policies higher in said hierarchy of policies.

11. The apparatus of claim 10, wherein each of said policies corresponds to an Internet Protocol security policy, and each of said associations corresponds to an Internet Protocol security association.

12. The apparatus of claim 9, wherein each of the associative memory entries is a ternary content-addressable memory entry.

13. The apparatus of claim 9, wherein all of said associative memory entries are searched in parallel based on the lookup word.

14. The apparatus of claim 9, wherein each of said policies corresponds to an Internet Protocol security policy, and each of said associations corresponds to an Internet Protocol security association.

15. The apparatus of claim 9, comprising means for adding, in response to identifying that said highest-priority matching entry corresponds to a particular policy of said policies and not to one of said associations, an associative memory entry corresponding to the particular policy to said associative memory entries; wherein said added associative memory entry is programmed into said associative memory entries prior to, in said predetermined priority ordering, the associative memory entry corresponding to the particular policy and after any associative memory entry corresponding to another of said policies higher in said hierarchy of policies.

16. The apparatus of claim 15, wherein each of said policies corresponds to an Internet Protocol security policy, and each of said associations corresponds to an Internet Protocol security association.

17. The apparatus of claim 15, wherein each of the associative memory entries is a ternary content-addressable memory entry.

* * * * *